(12) United States Patent
Saeki et al.

(10) Patent No.: US 12,331,796 B2
(45) Date of Patent: Jun. 17, 2025

(54) DAMPER DEVICE

(71) Applicant: AISIN CORPORATION, Aichi (JP)

(72) Inventors: Tomohiro Saeki, Kariya (JP); Keitaro Okada, Kariya (JP); Tomoki Kouroki, Kariya (JP)

(73) Assignee: AISIN CORPORATION, Aichi (JP)

( * ) Notice: Subject to any disclaimer, the term of this patent is extended or adjusted under 35 U.S.C. 154(b) by 472 days.

(21) Appl. No.: 17/835,295

(22) Filed: Jun. 8, 2022

(65) Prior Publication Data

US 2022/0403892 A1 Dec. 22, 2022

(30) Foreign Application Priority Data

Jun. 18, 2021 (JP) ................................. 2021-101389

(51) Int. Cl.
*F16D 3/12* (2006.01)
*F16D 7/02* (2006.01)
*F16F 15/123* (2006.01)

(52) U.S. Cl.
CPC ............... *F16D 3/12* (2013.01); *F16D 7/025* (2013.01); *F16F 15/12353* (2013.01); *F16F 2222/04* (2013.01); *F16F 2232/02* (2013.01)

(58) Field of Classification Search
CPC ...... F16D 3/12; F16D 7/025; F16F 15/12353; F16F 2222/04; F16F 2232/02
USPC .................................... 464/68.41; 192/214.1
See application file for complete search history.

(56) References Cited

U.S. PATENT DOCUMENTS

| 4,592,460 A * | 6/1986 | Kittel | F16F 15/12353 |
| | | | 192/213.31 |
| 4,687,086 A * | 8/1987 | Ward | F16F 15/1236 |
| | | | 464/68.41 |

FOREIGN PATENT DOCUMENTS

| EP | 0069458 A1 | 1/1983 |
| EP | 3104038 A1 | 12/2016 |
| JP | 2012097841 A | 5/2012 |
| JP | 2015148297 A | 8/2015 |
| JP | 6471486 B2 | 2/2019 |
| JP | 2021028522 A | 2/2021 |

* cited by examiner

*Primary Examiner* — Greg Binda
(74) *Attorney, Agent, or Firm* — Sughrue Mion, PLLC

(57) ABSTRACT

A damper device including a first rotary body; a second rotary body that is rotated relative to the first rotary body; an elastic mechanism portion; and a control plate that includes a radially extending portion that abuts against the elastic mechanism portion and an axially extending portion that is partially housed in at least one of the first rotary body and the second rotary body. The control plate is disposed in only one of the first housing space and the second housing space in the axial direction. The device also includes a first sliding portion that generates first sliding torque; and a second sliding portion that generates second sliding torque. The first sliding torque and the second sliding torque are generated when the first rotary body and the second rotary body are rotated relative to each other.

7 Claims, 22 Drawing Sheets

DAMPER DEVICE

INCORPORATION BY REFERENCE

The disclosure of Japanese Patent Application No. 2021-101389 filed on Jun. 18, 2021 including the specification, drawings and abstract is incorporated herein by reference in its entirety.

BACKGROUND OF THE DISCLOSURE

The technology disclosed herein relates to a damper device.

DESCRIPTION OF THE RELATED ART

In vehicles etc., a damper device is provided in a torque transfer path between a drive source such as an engine and a transmission to absorb vibration of torque transferred from the drive source to the transmission. The damper device is incorporated in a clutch device, for example.

A damper device with a common configuration is known to include a coil spring interposed between a disk plate as an input member and a hub as an output member, which are rotatable relative to each other, to absorb and damp torque fluctuations using elastic deformation of the coil spring. It is also known to further absorb the torque fluctuations by generating sliding torque (hysteresis torque) based on relative rotation between the disk plate and the hub, in addition to using the elastic deformation of the coil spring.

Japanese Patent No. 6471486 (JP 6471486 B), for example, discloses a damper device that includes, as main constituent elements, a first rotary member (reference sign 1 in JP 6471486 B) provided on the input side of power transfer, a second rotary member (reference sign 2 in JP 6471486 B) provided on the output side of power transfer, two control plates (reference signs 31 and 32 in JP 6471486 B), a first sliding member (reference signs 6 and 7 in JP 6471486 B) that generates first sliding torque, a second sliding member (reference signs 8 and 9 in JP 6471486 B) that generates second sliding torque that is larger than the first sliding torque, an elastic member 57 for which a cone spring is used, etc.

SUMMARY OF THE DISCLOSURE

In the damper device described in JP 6471486 B, however, the two control plates are housed between the first rotary member and the second rotary member in the axial direction, which increases the number of components and the axial length of the damper device and makes it difficult to mount the damper device on a vehicle etc.

Thus, a damper device with a short axial length is provided through various embodiments. In addition, a damper device that can stably generate a variety of hysteresis torques is also provided.

A first aspect provides a damper device including: a first rotary body that includes at least a first plate that is rotatable about a rotational axis and a second plate that is disposed to face the first plate and that is rotatable about the rotational axis together with the first plate; a second rotary body that is rotatable relative to the first rotary body about the rotational axis; an elastic mechanism portion that elastically couples the first rotary body and the second rotary body to each other in a rotational direction; a control plate that includes a radially extending portion that extends in a radial direction to abut against the elastic mechanism portion and an axially extending portion that extends in an axial direction to be at least partially housed in one of the first rotary body and the second rotary body, the control plate being disposed in only one of a first housing space between the first plate and the second rotary body and a second housing space between the second plate and the second rotary body in the axial direction; a first sliding portion that is disposed between the first rotary body and the control plate and that is slid with respect to at least one of the first rotary body and the control plate to generate first sliding torque; and a second sliding portion that is disposed between the second rotary body and the control plate and that is slid with respect to at least one of the second rotary body and the control plate to generate second sliding torque, in which the first sliding torque and the second sliding torque are generated when the first rotary body and the second rotary body are rotated relative to each other.

According to the first aspect, it is possible to provide a damper device with a short axial length and with the number of components thereof reduced by using a single control plate.

In the damper device according to the second aspect, one of the first sliding torque and the second sliding torque may be larger than the other, and may be generated only when the first rotary body and the second rotary body are rotated relative to each other in a predetermined direction.

According to the second aspect, the damper device according to the second aspect can generate small hysteresis torque (the smaller one of the first sliding torque and the second sliding torque) at all times when the first rotary body and the second rotary body are rotated relative to each other, and generate large hysteresis torque (the larger one of the first sliding torque and the second sliding torque) in the special case where the first rotary body and the second rotary body are rotated relative to each other in the predetermined direction. In this event, the magnitude of the "large hysteresis torque" can be further increased by setting one of the first sliding torque and the second sliding torque that is generated only in the special case to be larger than the other. In this manner, the damper device according to the second aspect can generate a variety of hysteresis torques. The "large hysteresis torque" discussed above can be used to suppress relatively large vibration or noise generated when an engine of a vehicle (hybrid vehicle, in particular) is started, for example.

In the damper device according to the third aspect, the elastic mechanism portion may include a first elastic member and a pair of seat members that supports the first elastic member by holding the first elastic member between the seat members from both sides, and the radially extending portion may abut against the first elastic member or one of the pair of seat members.

According to the third aspect, the radially extending portion can reliably abut against the elastic mechanism portion. As a result, the damper device according to the third aspect can efficiently generate the first sliding torque and the second sliding torque.

In the damper device according to the fourth aspect, the first sliding portion may include a first sliding surface that is slid with respect to the first rotary body or the radially extending portion and a second elastic member that biases the first sliding surface in a direction of moving closer to the first rotary body or the radially extending portion.

According to the fourth aspect, the damper device according to the fourth aspect can generate the first sliding torque reliably and efficiently.

In the damper device according to the fifth aspect, the second sliding portion may include a second sliding surface that is slid with respect to the second rotary body or the radially extending portion and a third elastic member that biases the second sliding surface in a direction of moving closer to the second rotary body or the radially extending portion.

According to the fifth aspect, the damper device according to the fifth aspect can generate the second sliding torque reliably and efficiently.

In the damper device according to the sixth aspect, the first sliding portion and the second sliding portion may be formed integrally with the control plate to function as a part of the control plate; and the radially extending portion may be directly slid with respect to the first rotary body, and directly slid with respect to the second rotary body.

According to the sixth aspect, it is possible to further reduce the number of components of the damper device according to the sixth aspect by constituting the control plate, the first sliding portion, and the second sliding portion as an integral object.

In the damper device according to the seventh aspect, a thrust member that includes at least one of a first surface that is slid with respect to the first rotary body and a second surface that is slid with respect to the second rotary body may be further provided in one of the first housing space and the second housing space that is different from one of the first housing space and the second housing space in which the control plate is disposed.

According to the seventh aspect, the damper device according to the seventh aspect can further generate additional hysteresis torque based on the first surface and the second surface.

In the damper device according to the eighth aspect, the thrust member may include a fourth elastic member that biases the second surface in a direction of moving closer to the second rotary body.

According to the eighth aspect, the damper device according to the eighth aspect can generate the additional hysteresis torque discussed above reliably and efficiently.

A damper device with a short axial length can be provided through the various embodiments. In addition, a damper device that can stably generate a variety of hysteresis torques can also be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF THE EMBODIMENTS

Various embodiments will be described below with reference to the accompanying drawings. Constituent requirements that are common to the drawings are denoted by like reference signs. It should be noted that a constituent element that appears in a certain drawing may be omitted in another drawing for convenience of illustration. Furthermore, it should be noted that the accompanying drawings are not always drawn to the correct scale.

1. Configuration of Damper Device

Figure 1:
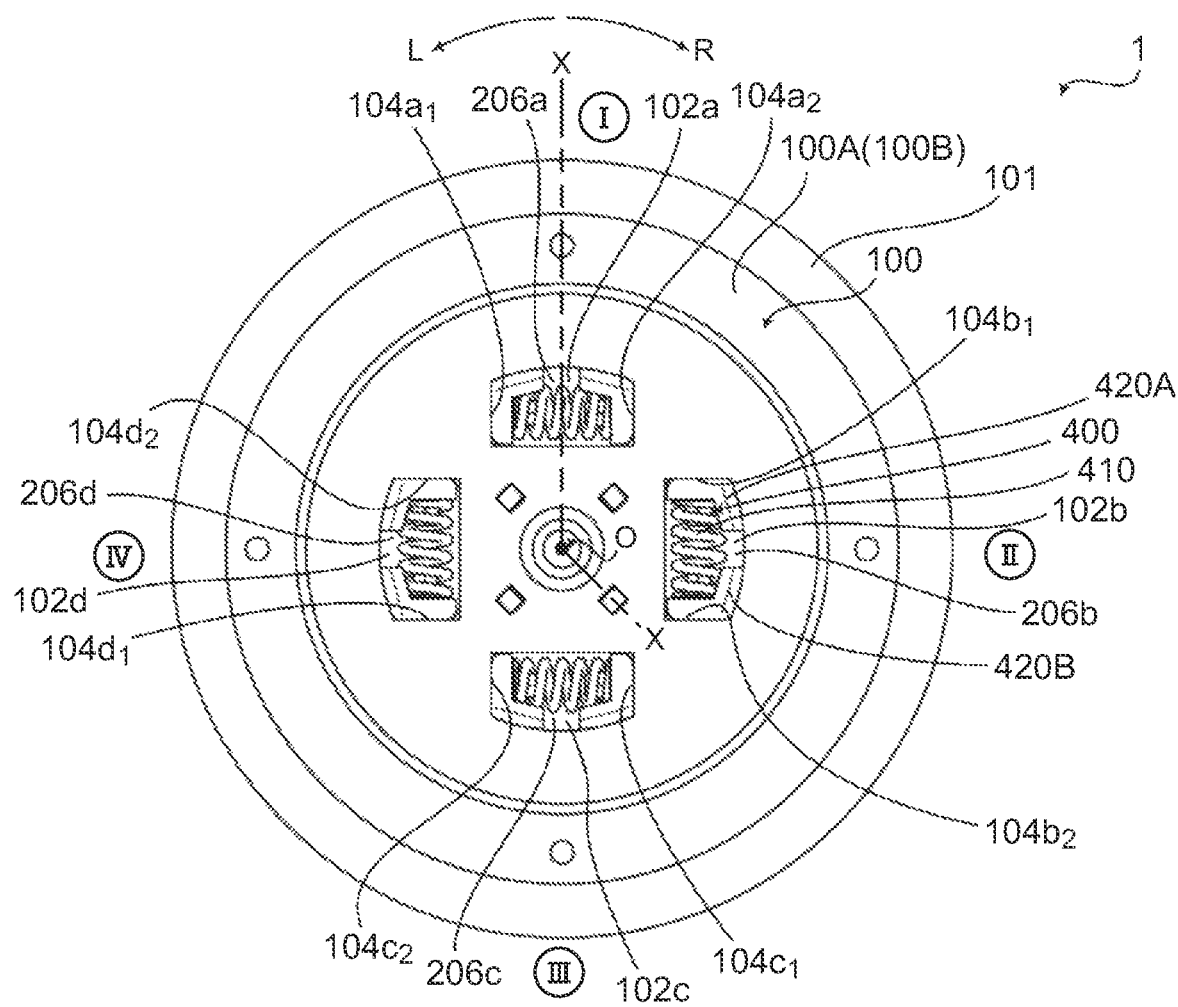
FIG. 1 is a schematic top view schematically illustrating the configuration of a damper device according to a first embodiment.
Figure 2:
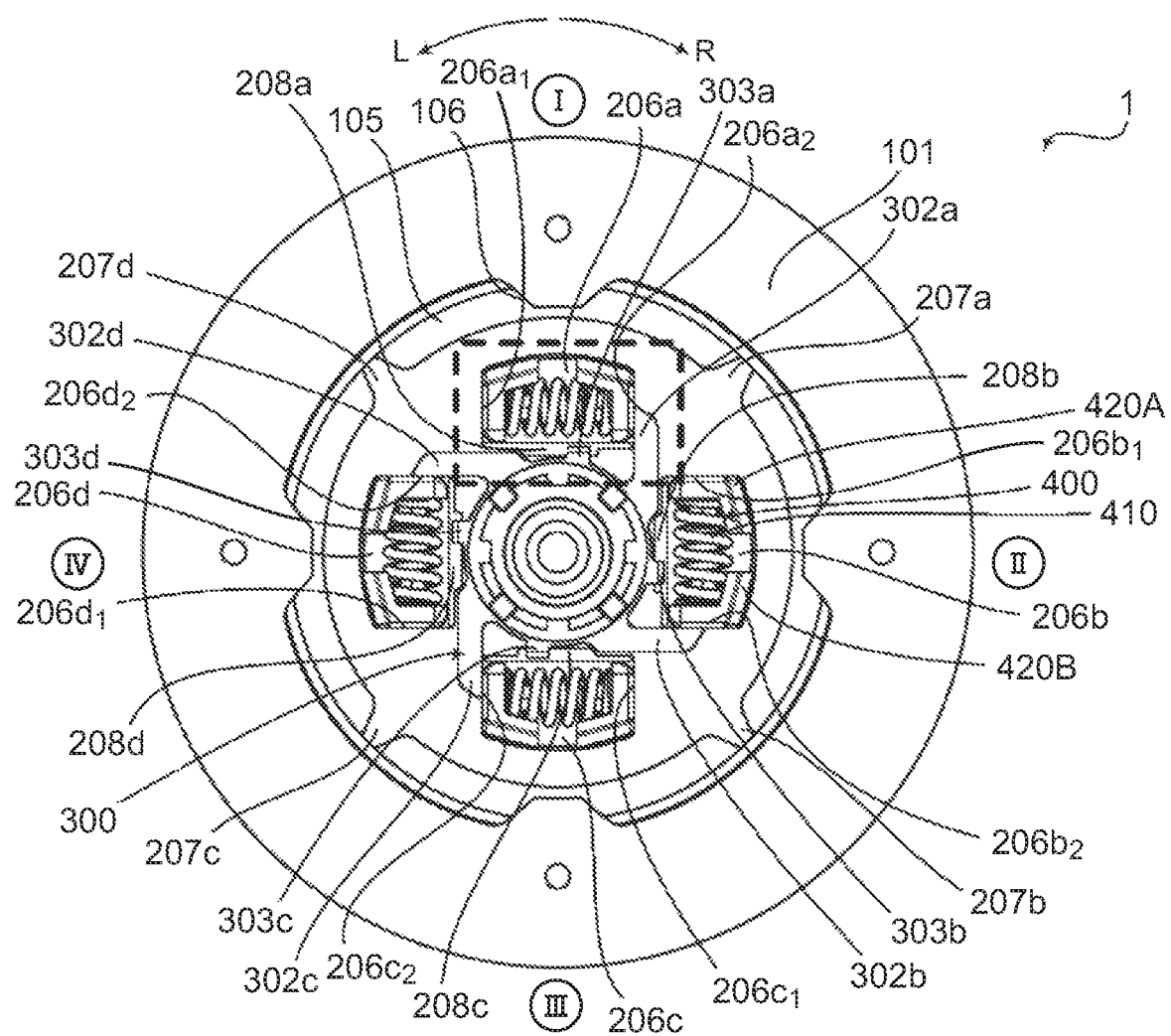
FIG. 2 is a schematic top view schematically illustrating the configuration of the damper device illustrated in FIG. 1 from which some constituent elements have been omitted.
Figure 3:
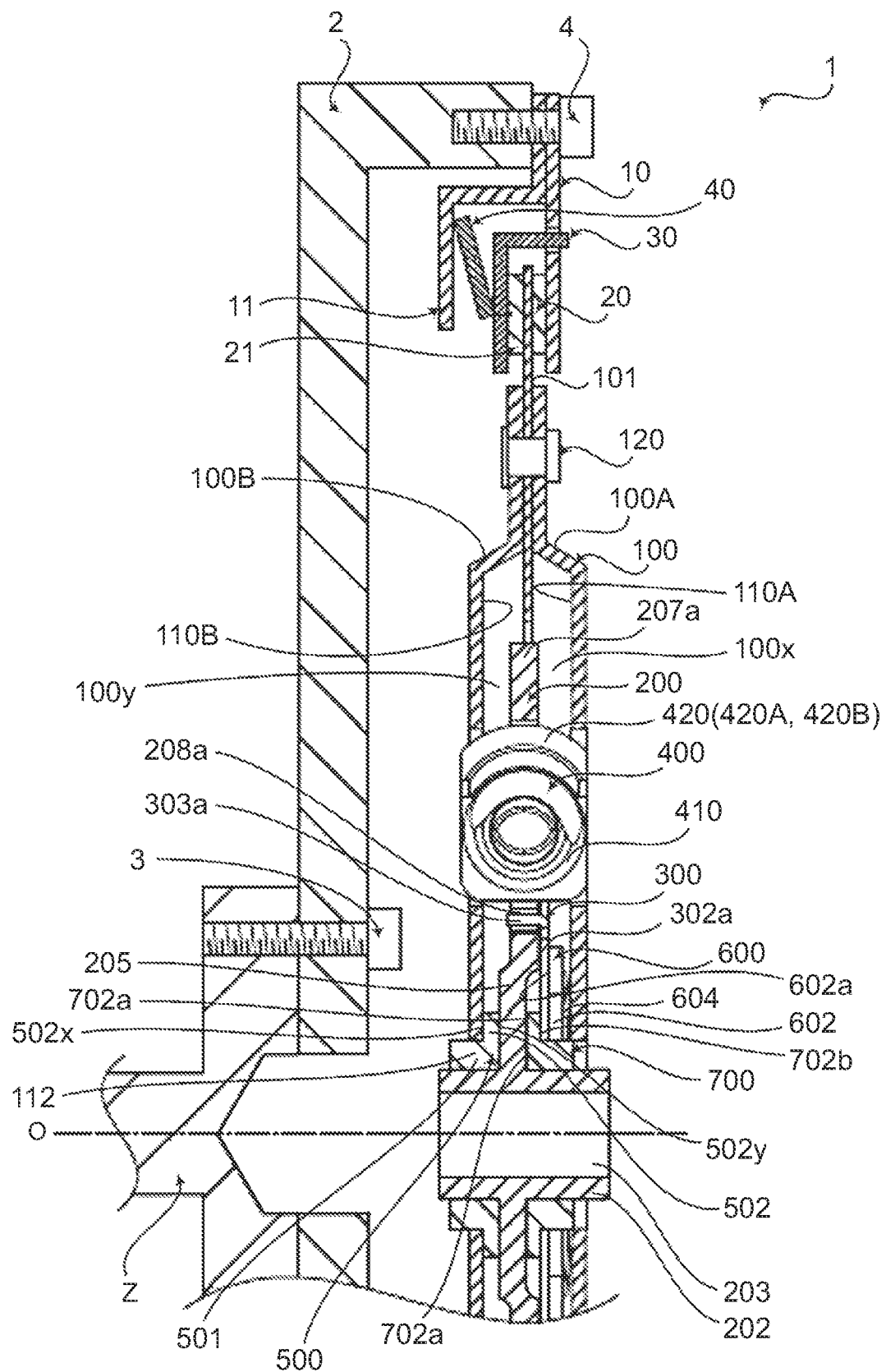
FIG. 3 is a schematic sectional view schematically illustrating the configuration of the damper device illustrated in FIG. 1 taken along the line X-X.
Figure 4:
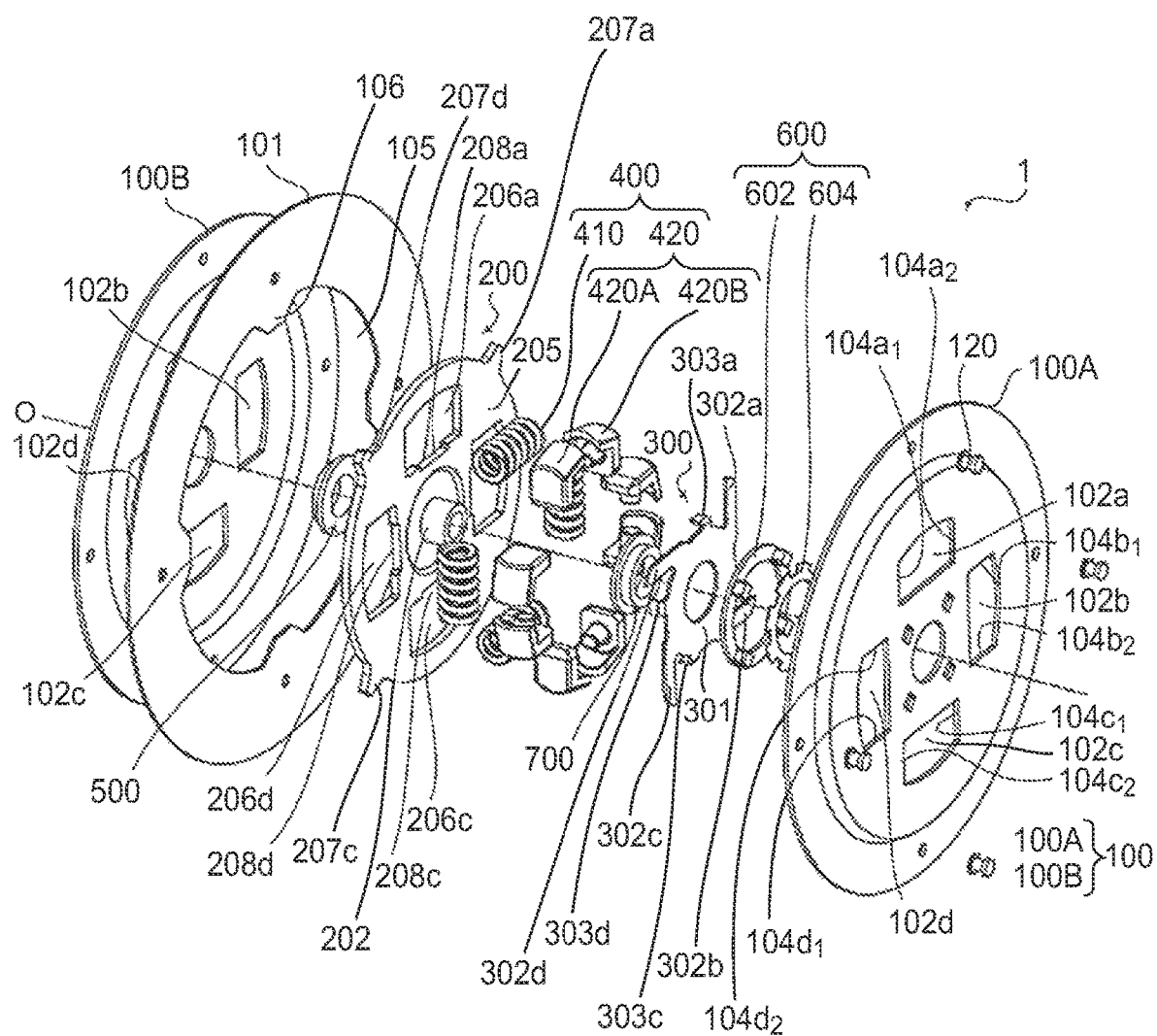
FIG. 4 is a schematic perspective view illustrating the configuration of the damper device according to the first embodiment as exploded into constituent elements.
Figure 5:
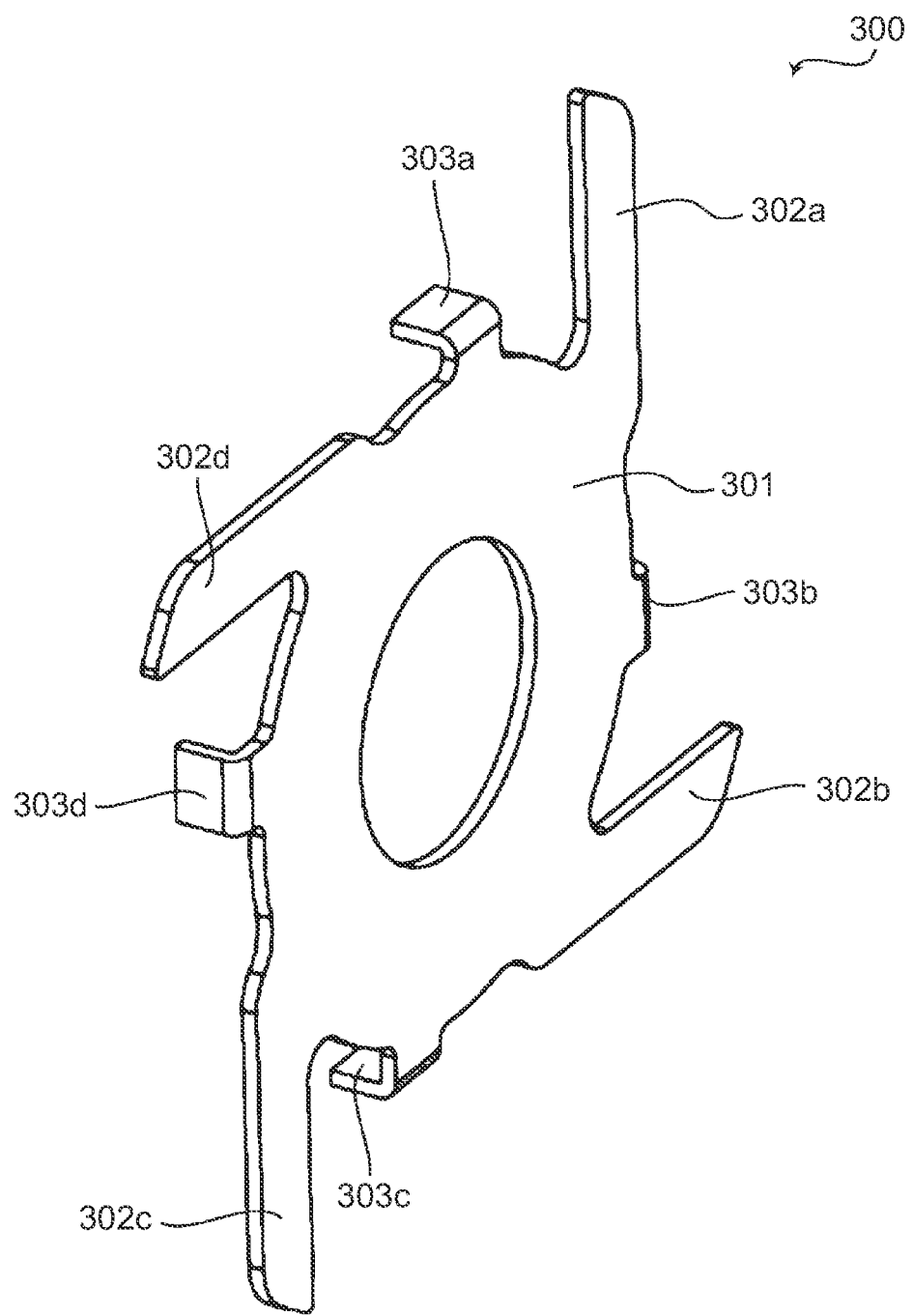
FIG. 5 is a schematic perspective view illustrating a control plate of the damper device according to the first embodiment as enlarged.
Figure 6:
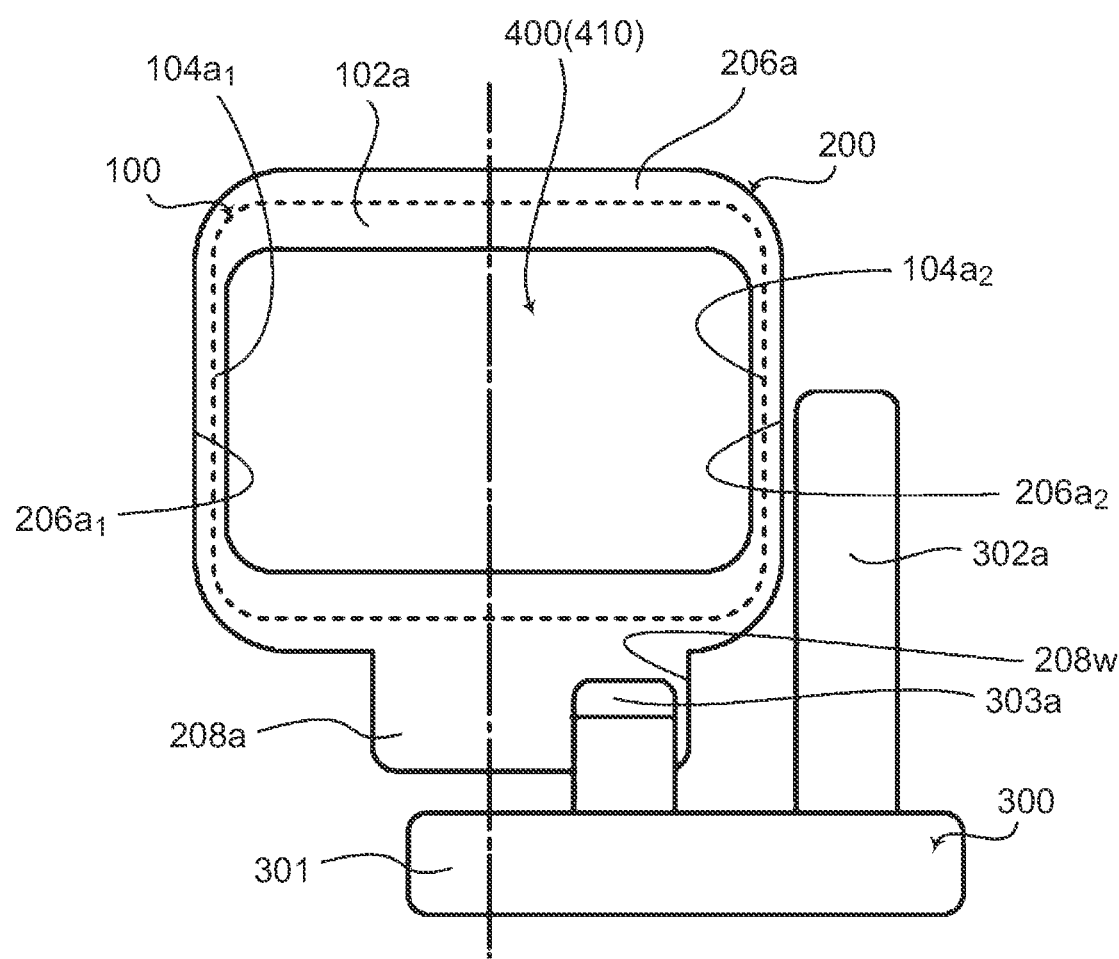
FIG. 6 is a schematic view schematically illustrating only a region of the damper device according to the first embodiment surrounded by the dotted line in FIG. 2 as enlarged.

An overview of the overall configuration of a damper device according to a first embodiment will be described with reference to FIGS. 1 to 6. FIG. 1 is a schematic top view schematically illustrating the configuration of a damper device 1 according to the first embodiment. FIG. 2 is a schematic top view schematically illustrating the configuration of the damper device 1 illustrated in FIG. 1 from which some constituent elements have been omitted. FIG. 3 is a schematic sectional view schematically illustrating the configuration of the damper device 1 illustrated in FIG. 1 taken along the line X-X. FIG. 4 is a schematic perspective view illustrating the configuration of the damper device 1 according to the first embodiment as exploded into constituent elements. FIG. 5 is a schematic perspective view illustrating a control plate 300 of the damper device 1 according to the first embodiment as enlarged. FIG. 6 is a schematic view schematically illustrating only a region of the damper device 1 according to the first embodiment surrounded by the dotted line in FIG. 2 as enlarged. It should be noted that a pair of seat members 420 of an elastic mechanism portion 400 to be discussed later is not illustrated in FIG. 6 for convenience, and that the relationship of abutment between constituent elements (e.g. between the elastic mechanism portion 400 and a disk plate 100 and between the elastic mechanism portion 400 and a hub 200) is not illustrated accurately.

The damper device 1 according to the first embodiment is provided in a power transfer path between a drive source (not illustrated) such as an engine or a motor and a transmission etc., and receives power from the drive source via a flywheel 2 and transfers (outputs) the power to the transmission etc. (see FIG. 3).

The damper device 1 absorbs and damps torque vibration. As illustrated in FIGS. 1 to 5, the damper device 1 mainly includes a disk plate 100 as a first rotary body to which power is transferred from the flywheel 2, a hub 200 as a second rotary body, a control plate 300, an elastic mechanism portion 400, a thrust member 500, a first sliding portion 600, and a second sliding portion 700. Herein, the axial direction means a direction that extends in parallel with a rotational axis O, the radial direction means a direction that is orthogonal to the rotational axis O, and the circumferential direction means a direction that circulates around the rotational axis O.

The flywheel 2 is an annular plate member fixed by a bolt 3 to a drive shaft Z connected to the drive source.

As illustrated in FIG. 3, power transferred from the drive shaft Z to the flywheel 2 is transferred to the disk plate 100 via a cover plate 10 fixed to the flywheel 2 by a bolt 4 to rotate together with the flywheel 2 and a first friction material 20. A pressure plate 30 is fixed to the cover plate 10. The cover plate 10 and the pressure plate 30 are configured to rotate together with each other. Further, a support plate 11 is fixed to the flywheel 2 together with the cover plate 10 by the bolt 4. The support plate 11 supports a disk spring 40. The disk spring 40 biases the pressure plate 30 so as to be pressed against a lining plate 101 of the disk plate 100, to be discussed later, via a second friction material 21, and transfers the power transferred to the flywheel 2 to the disk plate 100 (lining plate 101) together with the cover plate 10.

The support plate 11, the pressure plate 30, and the disk spring 40 can function as a limiter that causes slipping (blocks power transfer from the cover plate 10 and the pressure plate 30 to the disk plate 100) when the damper device 1 cannot absorb torque fluctuations in the torsional direction. The limiter may be combined with a structure known in the art.

1-1. Disk Plate 100

In the damper device 1, as discussed above, power from the drive source such as an engine or a motor is transferred via the flywheel 2 to the disk plate 100 as a first rotary body disposed most upstream in the power transfer path. The disk plate 100 is formed from a metal material, for example, and provided so as to be rotatable about the rotational axis O with the hub 200 as the second rotary body, to be discussed later, etc. interposed as illustrated in FIGS. 1 to 4. The disk plate 100 includes a first plate 100A and a second plate 100B as a pair of substantially disk-shaped plate members provided on both sides of the hub 200 in the axial direction (with the second plate 100B disposed to face the first plate 100A in the axial direction). As illustrated in FIGS. 3 and 4, the first plate 100A and the second plate 100B are shaped to be symmetrical to each other in the axial direction, and coupled to each other by a plurality of rivets 120 provided in the vicinity of the outer periphery thereof with the substantially annular lining plate 101, which can appropriately adjust the positions of the two plates in the axial direction, interposed therebetween so as to be rotatable together with each other.

When power from the drive source such as an engine or a motor is transferred from the cover plate 10 and the pressure plate 30 to the lining plate 101 via the first friction material 20 and the second friction material 21 provided on the lining plate 101, the power is transferred from the lining plate 101 to the first plate 100A and the second plate 100B in the vicinity of the rivets 120.

The first plate 100A and the second plate 100B cooperate with each other to have an axially swelling shape so as to form housing regions (four housing regions are illustrated in the example illustrated in FIG. 1) that house the elastic mechanism portion 400, to be discussed later, in correlation with regions I to IV as illustrated in FIGS. 1 and 2. Each of the housing regions extends substantially linearly or substantially arcuately along the circumferential direction of the disk plate 100 in order to house a first elastic member 410 of the elastic mechanism portion 400 that extends along the circumferential direction of the disk plate 100 and a pair of seat members 420 (a seat member 420A and a seat member 420B). The regions I to TV refer to the four regions each having a fan shape of approximately 90 degrees, as illustrated in FIG. 1, when the damper device 1 is seen from above.

More specifically, with reference to FIG. 1, the first plate 100A and the second plate 100B form a first housing region 102a, a second housing region 102b, a third housing region 102c, and a fourth housing region 102d that extend along the circumferential direction in correlation with the regions I to IV, respectively. As discussed later, the hub 200 is provided with window holes 206a, 206b, 206c, and 206d corresponding to the first housing region 102a, the second housing region 102b, the third housing region 102c, and the fourth housing region 102d, respectively.

Focusing on the region IV, as illustrated in FIG. 1, the first plate 100A and the second plate 100B include one end surface (fourth one end surface) $104d_1$ and the other end surface (fourth other end surface) $104d_2$ that faces the one end surface 104d, as side walls that surround the fourth housing region 102d. The fourth one end surface $104d_1$ and the fourth other end surface 104d2 extend along the axial direction of the disk plate 100, by way of example.

Likewise, focusing on the region I, the first plate 100A and the second plate 100B include one end surface (first one end surface) $104a_1$ and the other end surface (first other end surface) $104a_2$ that faces the one end surface $104a_1$ as side walls that surround the first housing region 102a. Focusing on the region II, the first plate 100A and the second plate 100B include one end surface (second one end surface) $104b_1$ and the other end surface (second other end surface) $104b_2$ that faces the one end surface $104b_1$ as side walls that surround the second housing region 102b. Focusing on the region III, the first plate 100A and the second plate 100B include one end surface (third one end surface) $104c_1$ and the other end surface (third other end surface) $104c_2$ that faces the one end surface $104c_1$ as side walls that surround the third housing region 102c. The side walls abut against (are engaged with) the elastic mechanism portion 400 to be discussed later.

As illustrated in FIG. 3, the lining plate 101 of the disk plate 100 is disposed at the same axial position (on the same line in the radial direction) as the hub 200. Thus, as illustrated in FIGS. 2 and 4, a notch 105 that allows movement (relative rotation) of the hub 200 in the circumferential direction is provided in each of the regions I to IV of the lining plate 101. The outer edge portion of the notch 105 functions as a regulating portion 106 that regulates excessive relative rotation of the hub 200.

An inner surface 110A of the first plate 100A can support a second elastic member 604 that may form a part of the first sliding portion 600 to be discussed later. As discussed later, when the first sliding portion 600 is provided between the second plate 100B and the hub 200, an inner surface 110B of the second plate 100B can support the second elastic member 604.

The other details of the first plate 100A and the second plate 100B will be discussed later as appropriate.

1-2. Hub 200

The hub 200 as the second rotary body functions as an output member of the damper device 1, is formed from a metal material, for example, has a substantially disk-like shape as a whole, and is provided as interposed between the first plate 100A and the second plate 100B so as to be rotatable relative to the disk plate 100 (the first plate 100A and the second plate 100B) about the rotational axis O. As illustrated in FIGS. 3 and 4, the hub 200 has a through hole 203 formed in a cylindrical portion 202 that is substantially cylindrical. An input shaft (not illustrated) of the transmission can be inserted through the through hole 203 to be splined with the hub 200. The hub 200 is provided with a disk portion 205 that extends radially outward from the cylindrical portion 202.

As discussed above, the disk portion 205 is provided with the window holes 206a, 206b, 206c, and 206d corresponding to the first housing region 102a, the second housing region 102b, the third housing region 102c, and the fourth housing region 102d, respectively, and provided at equal intervals. The window holes 206a to 206d provided in the hub 200 are each provided in correspondence with the elastic mechanism portion 400 to be discussed later. That is, the elastic mechanism portion 400 is housed in each of the window holes 206a to 206d.

As illustrated in FIG. 2, the window hole 206a, which is provided in correlation with the region I, has a one-end engagement portion (first one-end engagement portion) $206a_1$ and an other-end engagement portion (first other-end engagement portion) $206a_2$ that faces the one-end engagement portion $206a_1$, and abuts against (is engaged with) the elastic mechanism portion 400. Likewise, the window hole 206b, which is provided in correlation with the region TI, has a one-end engagement portion (second one-end engagement portion) $206b_1$ and an other-end engagement portion (second other-end engagement portion) $206b_2$ that faces the one-end engagement portion $206b_1$, and abuts against (is engaged with) the elastic mechanism portion 400. The window hole 206c, which is provided in correlation with the region III, has a one-end engagement portion (third one-end engagement portion) $206c_1$ and an other-end engagement portion (third other-end engagement portion) $206c_2$ that faces the one-end engagement portion $206c_1$, and abuts against (is engaged with) the elastic mechanism portion 400. The window hole 206d, which is provided in correlation with the region IV, has a one-end engagement portion (fourth one-end engagement portion) $206d_1$ and an other-end engagement portion (fourth other-end engagement portion) $206d_2$ that faces the one-end engagement portion $206d_1$, and abuts against (is engaged with) the elastic mechanism portion 400.

Each of the window holes 206a to 206d "abutting against the elastic mechanism portion 400" means that each of the window holes 206a to 206d abuts against the first elastic member 410 or the pair of seat members 420 to be discussed later.

Protruding portions 207a, 207b, 207c, and 207d are provided at the radial end portion of the disk portion 205 in correlation with the regions I to IV, respectively. The protruding portions 207a to 207d are each housed in the notch 105 provided in the lining plate 101 such that the hub 200 is rotatable relative to the disk plate 100. When the hub 200 is relatively rotated by a predetermined torsion angle, the protruding portions 207a to 207d each abut against the regulating portion 106, which is the outer edge portion of the notch 105, to regulate excessive relative rotation of the hub 200.

As illustrated in FIGS. 2 to 4, groove portions 208a, 208b, 208c, and 208d that receive axially extending portions 303a to 303d of the control plate 300, to be discussed later, are provided on the radially inner side of the window holes 206a, 206b, 206c, and 206d, respectively, discussed above. While the groove portions 208a to 208d are provided continuously (integrally) with the window holes 206a to 206d, respectively, in the damper device 1 according to the first embodiment, this is not limiting. The groove portions 208a to 208d may be provided in any portion of the disk portion 205.

1-3. Control Plate 300

The control plate 300 is formed from a metal material such as spring steel, for example, and has a substantially annular shape as a whole. The damper device 1 according to the embodiment is provided with only one control plate 300.

The control plate 300 is disposed in only one of a first housing space 100x, which is provided between the first plate 100A and the hub 200, and a second housing space 100y, which is provided between the second plate 100B and the hub 200, in the axial direction. In the example illustrated in FIG. 3, the control plate 300 is disposed in the first housing space 100x.

As illustrated in FIGS. 2 to 5, the control plate 300 mainly includes a main portion 301 provided in a substantially annular shape, a radially extending portion 302 that extends in the radial direction from the main portion 301 to abut against the elastic mechanism portion 400 to be discussed later, and an axially extending portion 303 that extends in the axial direction to be at least partially housed in the hub 200 (a case where the axially extending portion 303 is partially housed in the first rotary body 100 will be discussed later). The radially extending portion 302 includes a radially extending portion 302a in the region I, a radially extending portion 302b in the region II, a radially extending portion 302c in the region III, and a radially extending portion 302d in the region IV, provided in correspondence with the regions I to IV, respectively, discussed above. Likewise, the axially extending portion 303 includes an axially extending portion 303a in the region I, an axially extending portion 303b in the region I, an axially extending portion 303c in the region III, and an axially extending portion 303d in the region IV, provided in correspondence with the regions I to TV, respectively, discussed above.

As illustrated in FIG. 2 etc., the radially extending portions 302a to 302d are provided in correlation with the regions I to IV, respectively. The radially extending portion 302a is provided so as to abut against the first elastic member 410 (or one of the seat member 420A and the seat member 420B that constitute the pair of seat members 420) housed in the first housing region 102a (window hole 206a). The radially extending portion 302b is provided so as to abut against the first elastic member 410 (or one of the seat member 420A and the seat member 420B that constitute the pair of seat members 420) housed in the second housing region 102b (window hole 206b). The radially extending portion 302c is provided so as to abut against the first elastic member 410 (or one of the seat member 420A and the seat member 420B that constitute the pair of seat members 420) housed in the third housing region 102c (window hole 206c). The radially extending portion 302d is provided so as to abut against the first elastic member 410 (or one of the seat member 420A and the seat member 420B that constitute the pair of seat members 420) housed in the fourth housing region 102d (window hole 206d).

The length over which the radially extending portions 302a to 302d extend in the radial direction is not specifically limited as long as a sufficient contact area can be secured for contact with the elastic mechanism portion 400 (the first elastic member 410 or one of the seat member 420A and the seat member 420B that constitute the pair of seat members 420).

When the control plate 300 is disposed in the first housing space 100x as illustrated in FIG. 3, the radially extending portions 302a to 302d face both the first plate 100A and the hub 200 in the axial direction. Thus, the radially extending portions 302a to 302d have a surface that is in sliding contact with the first sliding portion 600, to be discussed later, disposed between the first plate 100A and the control plate 300 to generate first sliding torque.

As illustrated in FIGS. 2 to 6, the axially extending portions 303a to 303d are provided in correlation with the regions I to IV, respectively. The axially extending portion 303a is housed in the groove portion 208a provided on the radially inner side of the window hole 206a. The axially extending portion 303b is housed in the groove portion 208b provided on the radially inner side of the window hole 206b. The axially extending portion 303c is housed in the groove portion 208c provided on the radially inner side of the window hole 206c. The axially extending portion 303d is housed in the groove portion 208d provided on the radially inner side of the window hole 206d.

As illustrated in FIG. 6, the axially extending portion 303a is housed at a position proximate to a wall portion 208w that defines the groove portion 208a (a position at least off the center position of the groove portion 208a). The axially extending portion 303b, the axially extending portion 303c, and the axially extending portion 303d are also housed at a similar position to the axially extending portion 303a in the corresponding groove portions 208b, 208c, and 208d, respectively.

The axially extending portions 303a to 303d are not engaged or fitted by any mechanism with the hub 200 in the corresponding groove portions 208a to 208d, respectively, and the hub 200 and the control plate 300 are configured to be rotatable together with each other only in a predetermined case. Thus, the control plate 300 and the hub 200 are not rotated together with each other at all times.

The "predetermined case" mentioned above will be described. When the hub 200 is rotated in a predetermined direction (e.g. L direction (counterclockwise direction) in FIGS. 1 and 2) relative to the disk plate 100 by a predetermined torsion angle or more, for example, the axially extending portions 303a to 303d each abut against the wall portion 208w that defines the groove portions 208a to 208d, respectively. Consequently, the control plate 300 is rotated in the predetermined direction (e.g. L direction (counterclockwise direction) in FIGS. 1 and 2) relative to the disk plate 100 together with the hub 200 only when the hub 200 is rotated in the predetermined direction (L direction in FIGS. 1 and 2) relative to the disk plate 100 by the predetermined torsion angle or more. Consequently, the radially extending portion 302a can be in sliding contact with a sliding surface (first sliding surface) 602a of the first sliding portion 600, to be discussed later, to generate first sliding torque. Likewise, the radially extending portions 302b to 302d can also be in sliding contact with the first sliding surface 602a of the first sliding portion 600 to generate first sliding torque. The mechanism that allows the control plate 300 and the hub 200 to rotate together with each other will also be discussed in detail later.

In cases other than the case where the control plate 300 and the hub 200 rotate together with each other as discussed above, on the other hand, the hub 200 is basically rotated relative to the control plate 300. In such cases, the second sliding portion 700, to be discussed later, disposed between the hub 200 and the control plate 300 can be slid with respect to the hub 200, or slid with respect to the control plate 300, to generate second sliding torque.

Preferably, a commonly known friction material is applied separately, or a predetermined surface treatment is applied, to surfaces of the radially extending portions 302a to 302d that are in sliding contact with the first sliding surface 602a of the first sliding portion 600, in order to increase (or decrease) the magnitude of the first sliding torque. Consequently, it is possible to adjust the magnitude of the first sliding torque to a desired magnitude.

When the second sliding portion 700 to be discussed later is in sliding contact with the control plate 300 to generate second sliding torque, preferably, a commonly known friction material is applied separately, or a predetermined surface treatment is applied, to surfaces of the radially extending portions 302a to 302d that are in sliding contact with the second sliding portion 700 (surfaces on the opposite side in the axial direction of the surfaces that are in sliding contact with the first sliding surface 602a of the first sliding portion 600), in order to increase (or decrease) the magnitude of the second sliding torque.

In the damper device 1 according to the first embodiment illustrated in FIGS. 1 to 6, the first sliding torque generated only in the "predetermined case" discussed above is set, as appropriate, so as to be larger than the second sliding torque using the friction material, surface treatment, etc. discussed above.

1-4. Elastic Mechanism Portion 400

While the elastic mechanism portion 400 is mainly constituted from the first elastic member 410 and the pair of seat members 420 (the seat member 420A and the seat member 420B) that supports the first elastic member 410 by holding the first elastic member 410 therebetween from both sides in each of the regions I to IV as illustrated in FIGS. 1 to 4 and 6, the pair of seat members 420 may be omitted. While one first elastic member 410 may be disposed in each of the regions I to IV as illustrated in FIGS. 1 to 4, two or more first elastic members 410 may be disposed in series with each other.

A common coil spring can be used as the first elastic member 410, by way of example. The form, structure, etc. of the seat member 420A and the seat member 420B are not specifically limited as long as the seat members 420A and 420B may support the first elastic member 410 as interposed therebetween from both sides. For example, seat members known in the art can be used.

In the embodiment illustrated in FIGS. 1 to 4, by way of example, four housing regions, namely the first housing region 102a, the second housing region 102b, the third housing region 102c, and the fourth housing region 102d (in correspondence with which the hub 200 is provided with the window holes 206a, 206b, 206c, and 206d, respectively, as discussed above), are formed in the disk plate 100. Thus, one first elastic member 410 and a pair of seat members 420 (a seat member 420A and a seat member 420B) are housed in each of the four housing regions, that is, in correlation with each of the regions I to IV.

Focusing on the region I, as illustrated in FIGS. 1 and 2, the seat member 420A is engaged with each of the first one end surface $104a_1$ of the disk plate 100 (the first plate 100A and the second plate 100B) and the first one-end engagement portion $206a_1$ provided on the hub 200. The seat member 420B is engaged with each of the first other end surface $104a_2$ of the disk plate 100 (the first plate 100A and the second plate 100B) and the first other-end engagement portion $206a_2$ provided on the hub 200. Also for the regions II to IV, likewise, the seat member 420A and the seat member 420B that constitute the pair of seat members 420 are engaged with the disk plate 100 and the hub 200.

As discussed above, the radially extending portions 302a to 302d of the control plate 300 are provided so as to abut against the first elastic member 410 (or one of the seat member 420A and the seat member 420B that constitute the pair of seat members 420) in the regions I to IV, respectively, as illustrated in FIG. 2, etc.

With the configuration described above, the elastic mechanism portion 400 can elastically couple the disk plate 100 and the hub 200 to each other in the rotational direction.

That is, when power from a drive source such as an engine or a motor is transferred in the order of the disk plate 100, the elastic mechanism portion 400, and the hub 200 and the disk plate 100 and the hub 200 are rotated relative to each other, the first elastic member 410 of the elastic mechanism portion 400 is compressed and deformed to absorb torque fluctuations.

1-5. Thrust Member 500

The thrust member 500 is disposed in one of the first housing space 100x and the second housing space 100y discussed above that is different from the space in which the control plate 300 is disposed. That is, in the first embodiment illustrated in FIGS. 1 to 6, the control plate 300 is disposed in the first housing space 100x, and therefore the thrust member 500 is disposed in the second housing space 100y, rather than the first housing space 100x. When the control plate 300 is disposed in the second housing space 100y, the thrust member 500 is disposed in the first housing space 100x.

In the first embodiment in which the control plate 300 is disposed in the second housing space 100y, the thrust member 500 is disposed between the second plate 100B and the hub 200 as illustrated in FIG. 3. The thrust member 500 is formed from a resin material, for example, and includes a substantially cylindrical fitting portion 501 and a main portion 502 that has a substantially annular shape as a whole.

As illustrated in FIG. 3, the fitting portion 501 corresponds to a fitting hole 112 provided in the second plate 100B, and may be fitted (engaged) in the fitting hole 112, by way of example. Consequently, the thrust member 500 is integrated with the second plate 100B (disk plate 100), and rotated together with the disk plate 100 about the rotational axis O. The fitting portion 501 may be fitted in a different fitting hole (not illustrated) provided separately in the hub 200, for example, rather than being fitted in the fitting hole 112 provided in the second plate 100B, to be rotated together with the hub 200 about the rotational axis O. Alternatively, the fitting portion 501 may be configured not to be fitted with any of the second plate 100B and the hub 200.

As illustrated in FIG. 3, the main portion 502 includes a first surface 502x that is slidable with respect to the second plate 100B and a second surface 502y that is slidable with respect to the hub 200. Consequently, the main portion 502 can generate sliding torque (third sliding torque) that is different from the first sliding torque and the second sliding torque discussed above, by sliding with respect to the second plate 100B and/or the hub 200.

In the damper device 1 according to the first embodiment illustrated in FIGS. 1 to 6, as discussed later, the second elastic member 604 of the first sliding portion 600 biases a plate portion 602 in the direction of moving closer to the control plate 300 (in the leftward direction on the drawing sheet of FIG. 3). In this event, a reaction force related to the biasing is transferred from the second elastic member 604 to the first plate 100A so that the first plate 100A is slightly biased in the direction of moving away from the control plate 300 (in the rightward direction on the drawing sheet of FIG. 3). In conjunction with the biasing, the second plate 100B integrated with the first plate 100A via the rivets 120 is also slightly biased in the direction of moving closer to the control plate 300 (in the rightward direction on the drawing sheet of FIG. 3). Consequently, the second surface 502y of the thrust member 500 is pressed against the hub 200 to generate the third sliding torque discussed above.

The third sliding torque is generated at all times when the disk plate 100 and the hub 200 are rotated relative to each other, and can be used both when "small hysteresis torque" is constituted and when "large hysteresis torque is constituted" in the damper device 1. In the damper device 1 according to the first embodiment illustrated in FIGS. 1 to 6, the "small hysteresis torque" means the resultant torque of the second sliding torque discussed above and the third sliding torque, and the "large hysteresis torque" means the resultant torque of the first sliding torque discussed above and the third sliding torque.

1-6. First Sliding Portion 600

In the first embodiment, the first sliding portion 600 is disposed between the disk plate 100 (first plate 100A) and the control plate 300, and is slid with respect to the radially extending portion 302 (radially extending portions 302a to 302d) of the control plate 300 to generate first sliding torque.

As illustrated in FIGS. 3 and 4, the first sliding portion 600 according to the first embodiment includes a substantially annular plate portion 602 that includes a first sliding surface 602a that is slid with respect to the radially extending portion 302 (radially extending portions 302a to 302d) of the control plate 300, and a second elastic member 604 that biases the first sliding surface 602a of the plate portion 602 in the direction of moving closer to the radially extending portion 302 of the control plate 300 (in the leftward direction on the drawing sheet of FIG. 3). In the first embodiment, the first sliding portion 600 is configured such that the plate portion 602 extends in the axial direction to be engaged with the first plate 100A with the second elastic member 604 supported by the first plate 100A. Consequently, the first sliding portion 600 is configured to be rotatable together with the disk plate 100. Consequently, the first sliding portion 600 can generate first sliding torque with the first sliding surface 602a pressed against the radially extending portion 302 when the control plate 300 is rotated relative to the disk plate 100.

The plate portion 602 is formed from a resin material, a metal material constituted from a compound containing 3d transition metal, etc., for example. Preferably, a commonly known friction material is applied separately, or a predetermined surface treatment is applied, to the first sliding surface 602a, in order to increase (or decrease) the magnitude of the first sliding torque generated through the sliding with respect to the radially extending portion 302. Consequently, it is possible to adjust the magnitude of the first sliding torque to a desired magnitude.

While a commonly known disk spring can be used as the second elastic member 604, this is not limiting. The second elastic member 604 biases the first sliding surface 602a of the plate portion 602 in the direction of moving closer to the radially extending portion 302 of the control plate 300 (in the leftward direction on the drawing sheet of FIG. 3), as discussed above, while being supported by the first plate 100A. On the other hand, a reaction force related to the biasing is transferred from the second elastic member 604 to the first plate 100A.

1-7. Second Sliding Portion 700

In the first embodiment, the second sliding portion 700 is disposed between the control plate 300 and the hub 200, and is slid with respect to at least the hub 200 to generate second sliding torque.

In the first embodiment, the second sliding portion 700 has a substantially annular shape as a whole, and includes a second sliding surface 702a that is slidable with respect to the hub 200. Thus, in cases other than the "predetermined case" discussed above, the second sliding portion 700 is rotated relative to the hub 200, and the second sliding surface 702a is slid with respect to the hub 200 to generate second sliding torque.

The control plate 300 is biased in the direction of moving closer to the hub 200 in conjunction with the plate portion 602 of the first sliding portion 600 being biased in the direction of moving closer to the control plate 300 by the second elastic member 604 of the first sliding portion 600 discussed above. The biased control plate 300 biases the second sliding portion 700 in the direction of moving closer to the hub 200. Consequently, the second sliding surface 702a of the second sliding portion 700 is pressed against the hub 200 to reliably generate second sliding torque. That is, the biasing force of the second elastic member 604 is transferred sequentially to the plate portion 602, the control plate 300, and the second sliding portion 700.

The second sliding portion 700 may include a second sliding surface 702b that may be slid with respect to the control plate 300 to generate second sliding torque. When the control plate 300 and the second sliding portion 700 are configured to be rotatable relative to each other, the second sliding surface 702b and the radially extending portion 302 of the control plate 300 can be slid with respect to each other to generate second sliding torque.

In the first embodiment, the second sliding portion 700 may be configured to be engaged with the control plate 300 to rotate together with the control plate 300, may be configured to be engaged with neither of the control plate 300 and the hub 200, or may be configured to be engaged with the first plate 100A, for example.

Preferably, a commonly known friction material is applied separately, or a predetermined surface treatment is applied, to the second sliding surfaces 702a and 702b, as with the other sliding surfaces.

2. Operation of Damper Device

Figure 7A:
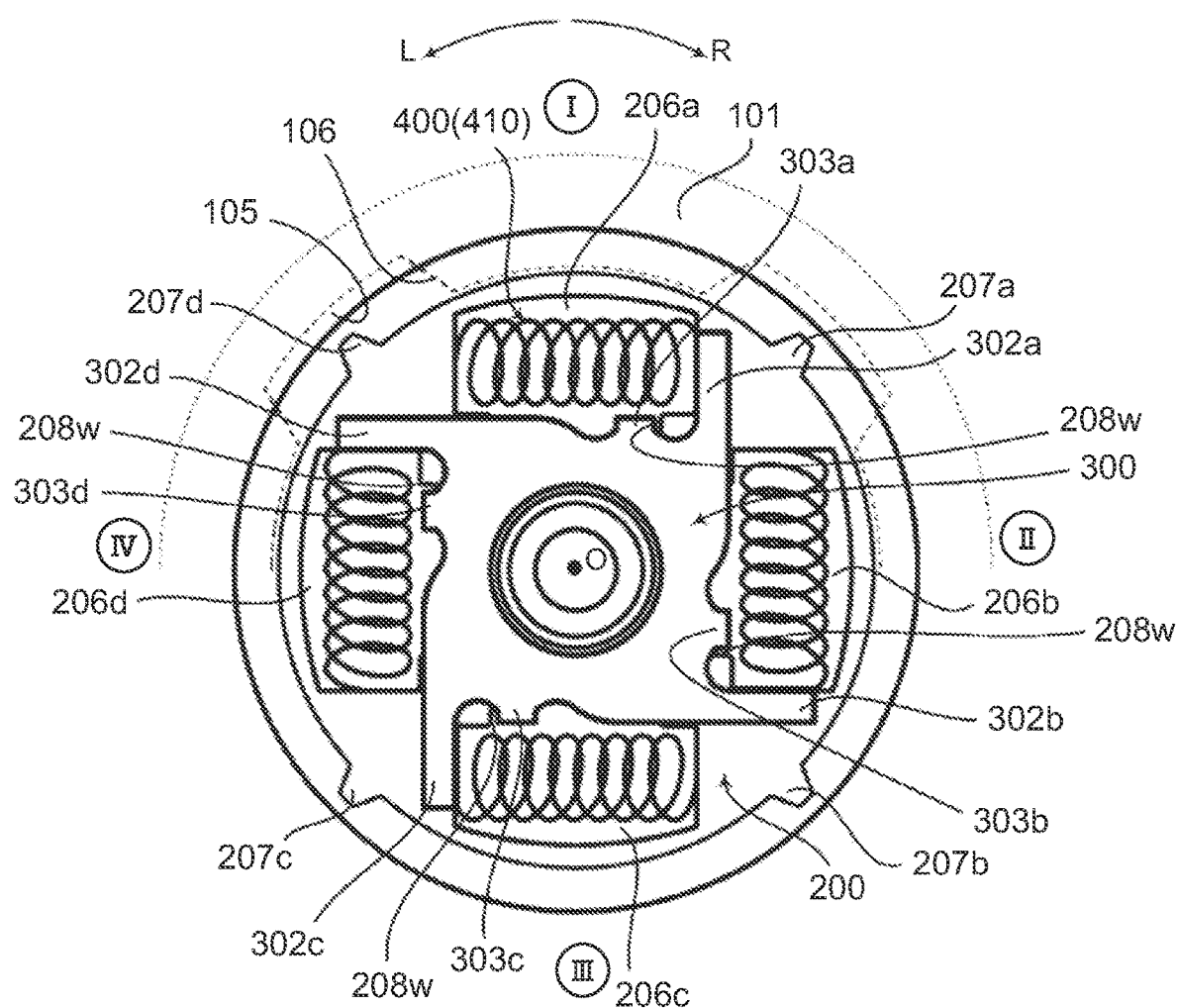
FIG. 7A is a schematic top view schematically illustrating a state in which a first rotary body and a second rotary body are not rotated relative to each other in the damper device according to the first embodiment.
Figure 7B:
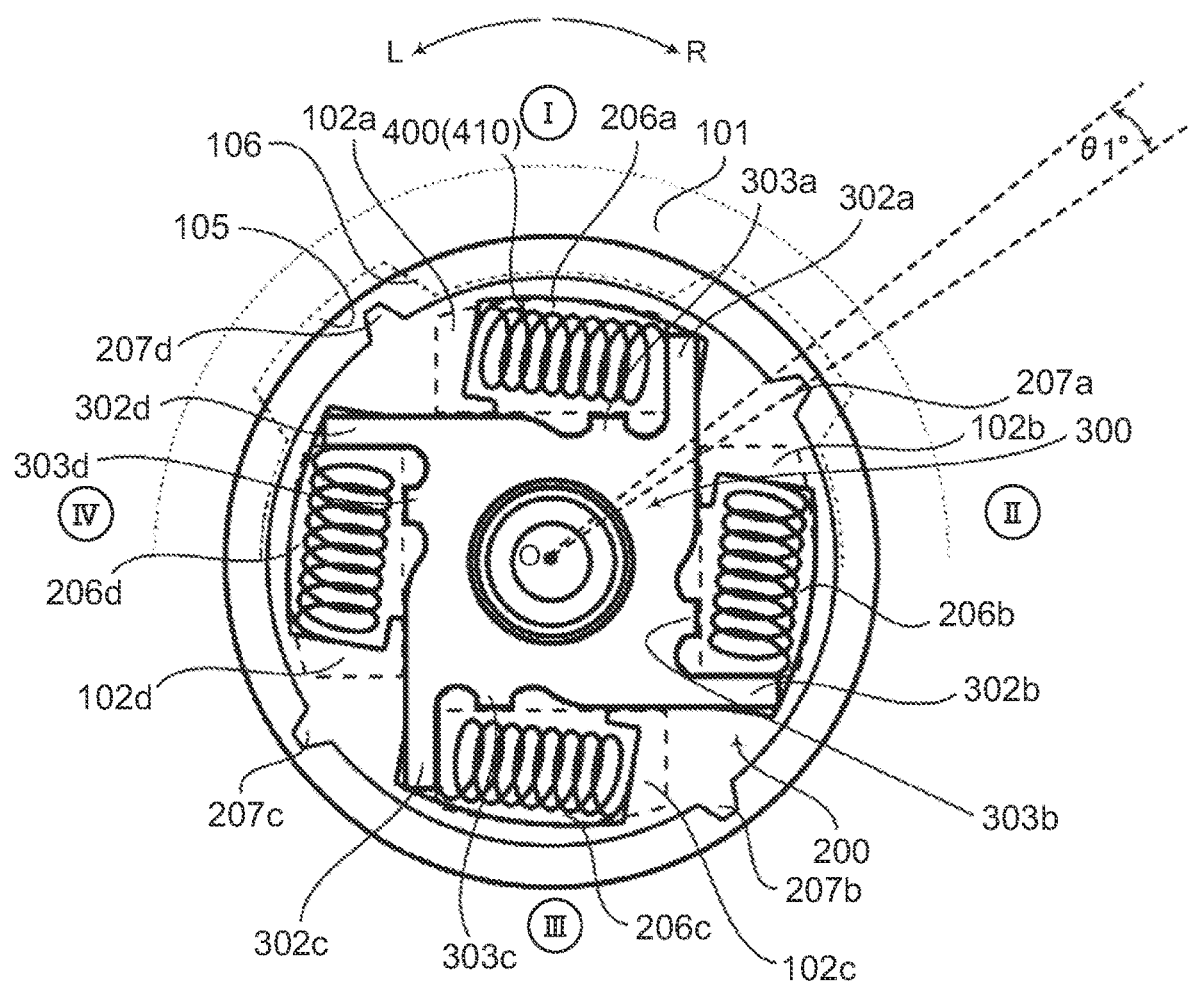
FIG. 7B is a schematic top view schematically illustrating a state in which the second rotary body is rotated to the positive side relative to the first rotary body by a torsion angle of $\theta 1°$ in the damper device according to the first embodiment.
Figure 7C:
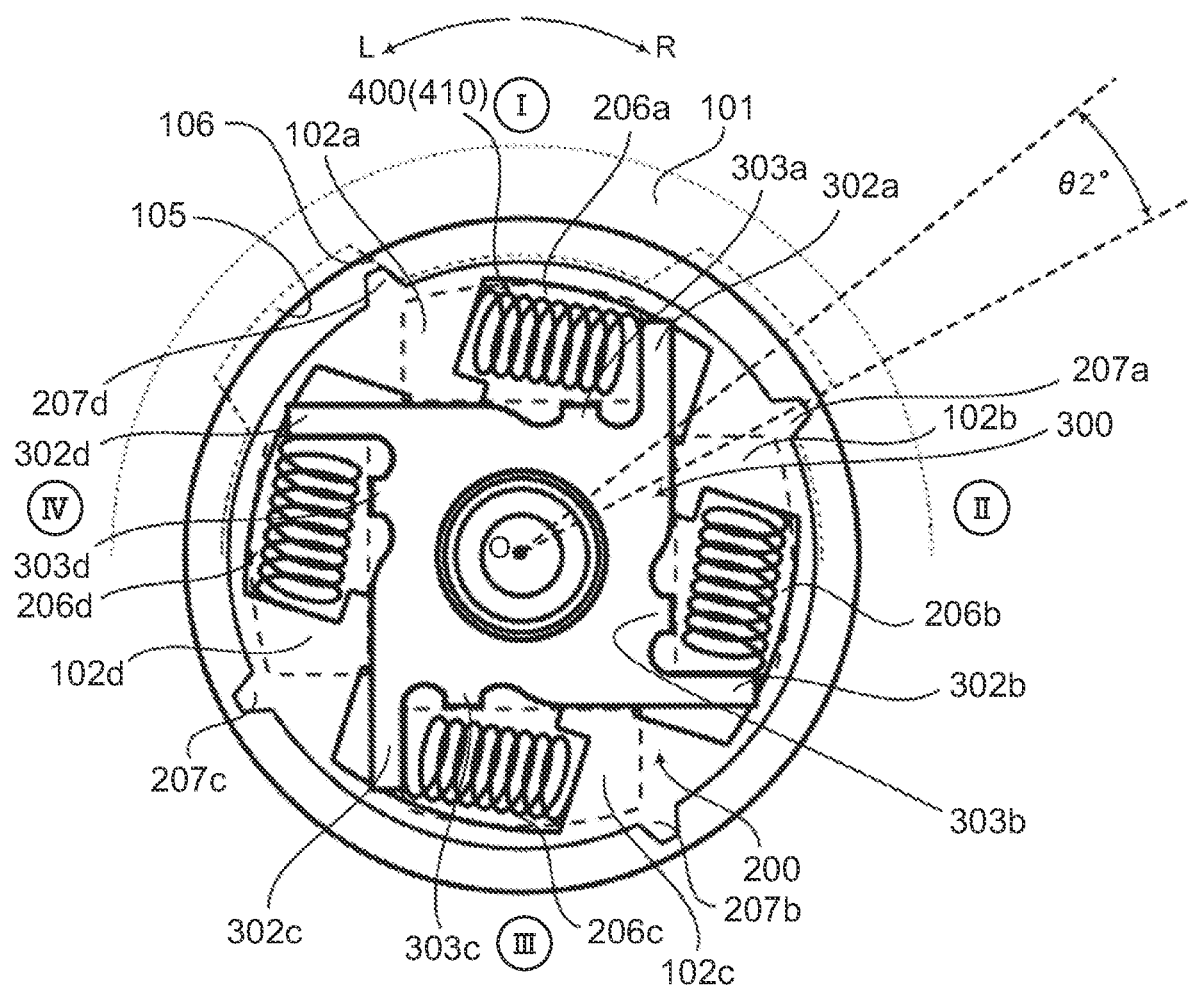
FIG. 7C is a schematic top view schematically illustrating a state in which the second rotary body is rotated to the positive side relative to the first rotary body by a torsion angle of $\theta 2°$ in the damper device according to the first embodiment.
Figure 7D:
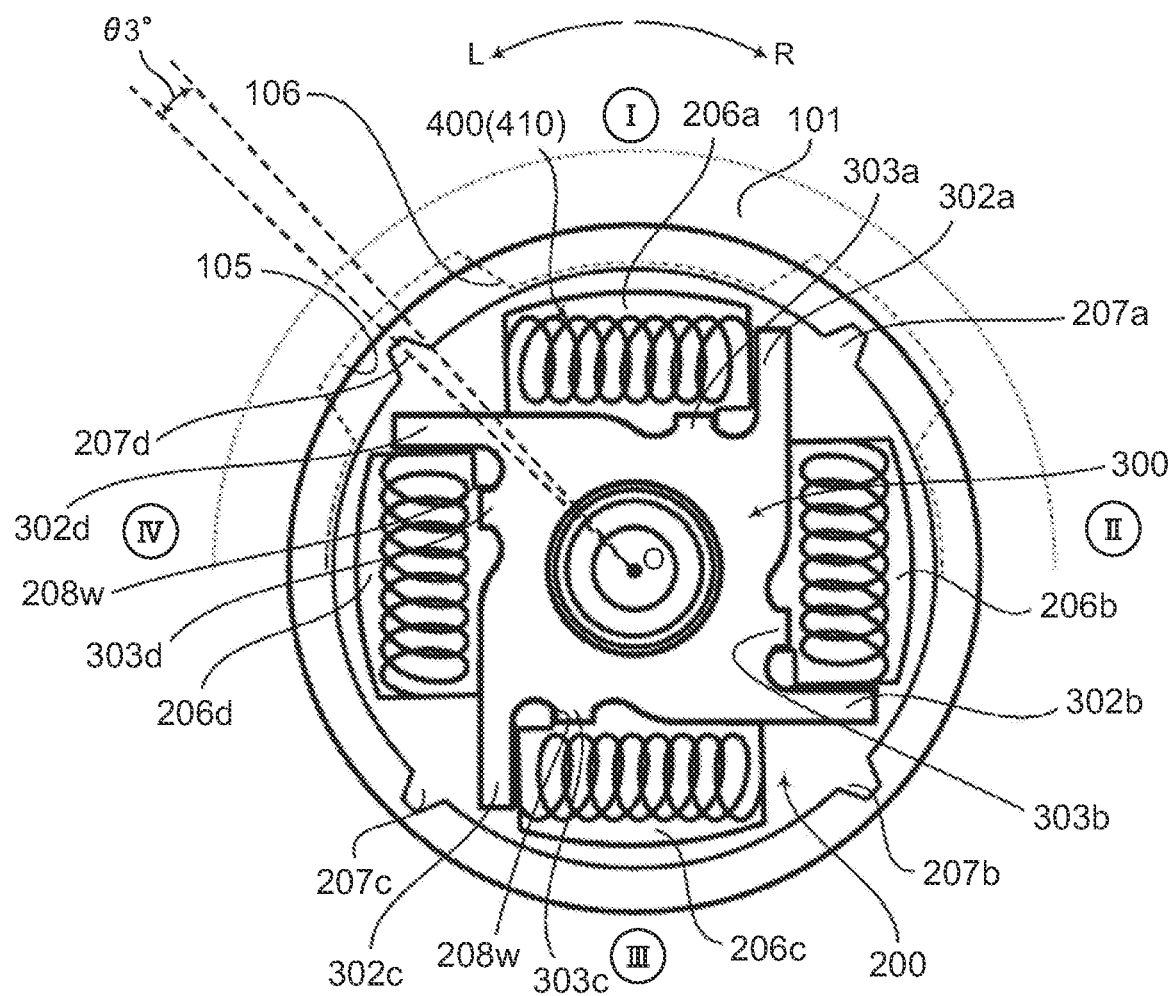
FIG. 7D is a schematic top view schematically illustrating a state in which the second rotary body is rotated to the negative side relative to the first rotary body by a torsion angle of $\theta 3°$ in the damper device according to the first embodiment.
Figure 7E:
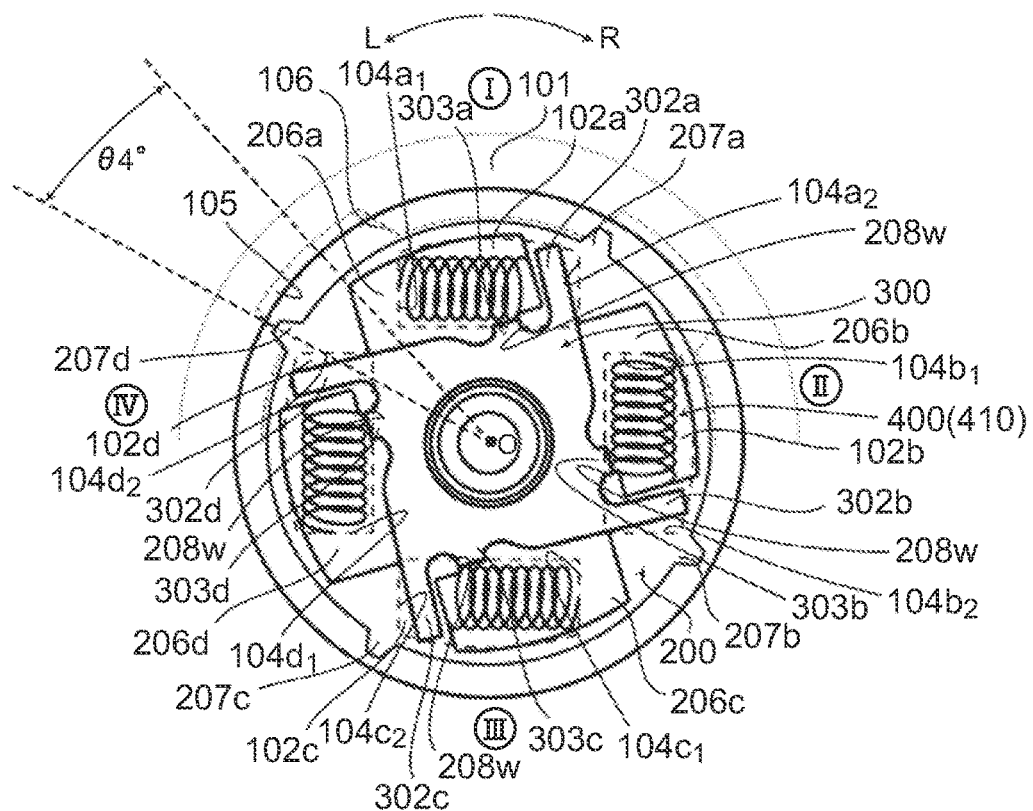
FIG. 7E is a schematic top view schematically illustrating a state in which the second rotary body is rotated to the negative side relative to the first rotary body by a torsion angle of $\theta 4°$ in the damper device according to the first embodiment.
Figure 7F:
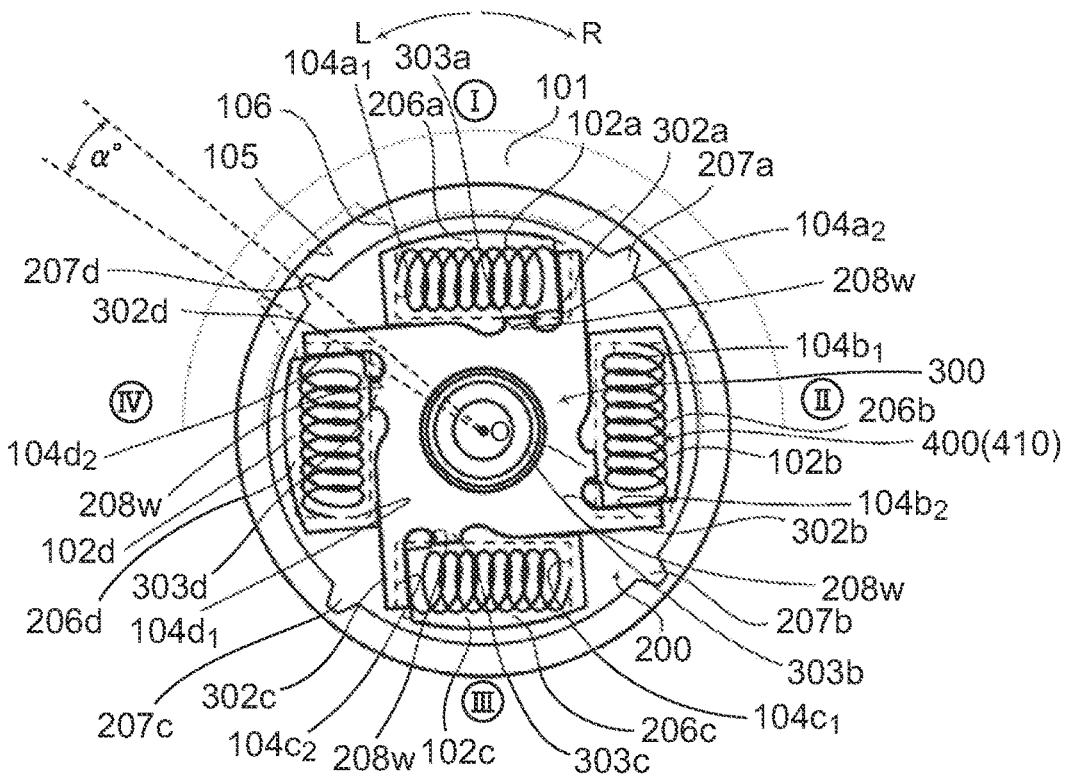
FIG. 7F is a schematic top view schematically illustrating a state in which rotation of the second rotary body relative to the first rotary body is being resolved from the state in FIG. 7E in the damper device according to the first embodiment.
Figure 8:
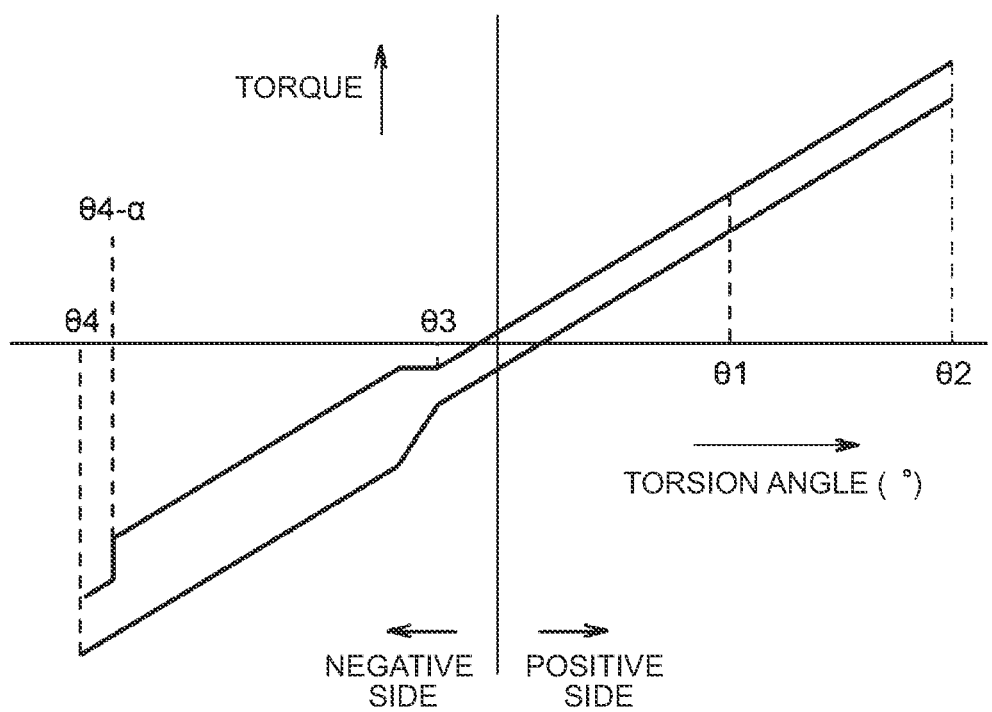
FIG. 8 is a schematic characteristic chart schematically illustrating the torsional characteristics of the damper device according to the first embodiment.

Next, operation of the damper device 1 configured as described above will be described with reference to FIGS. 7A to 7F and 8. FIG. 7A is a schematic top view schematically illustrating a state in which the first rotary body (disk plate 100) and the second rotary body (hub 200) are not rotated relative to each other in the damper device 1 according to the first embodiment. FIG. 7B is a schematic top view schematically illustrating a state in which the second rotary body (hub 200) is rotated to the positive side relative to the first rotary body (disk plate 100) by a torsion angle of θ1° in the damper device 1 according to the first embodiment. FIG. 7C is a schematic top view schematically illustrating a state in which the second rotary body (hub 200) is rotated to the positive side relative to the first rotary body (disk plate 100) by a torsion angle of θ2° in the damper device 1 according to the first embodiment. FIG. 7D is a schematic top view schematically illustrating a state in which the second rotary body (hub 200) is rotated to the negative side relative to the first rotary body (disk plate 100) by a torsion angle of θ3° in the damper device 1 according to the first embodiment. FIG. 7E is a schematic top view schematically illustrating a state in which the second rotary body (hub 200) is rotated to the negative side relative to the first rotary body (disk plate 100) by a torsion angle of θ4° in the damper device 1 according to the first embodiment. FIG. 7F is a schematic top view schematically illustrating a state in which rotation of the second rotary body (hub 200) relative to the first rotary body (disk plate 100) is being resolved from the state in FIG. 7E in the damper device 1 according to the first embodiment. FIG. 8 is a schematic characteristic chart schematically illustrating the torsional characteristics of the damper device 1 according to the first embodiment. In FIGS. 7A to 7F, the pair of seat members 420 (the seat member 420A and the seat member 420B) of the elastic mechanism portion 400 is not illustrated for convenience.

FIG. 7A illustrates a state in which power from the drive source such as an engine or a motor is transferred to the damper device 1 but in which no relative rotation is caused between the disk plate 100 and the hub 200 (torsion angle: 0°). In this case, none of the first sliding torque, the second sliding torque, and the third sliding torque discussed above is generated.

In the state illustrated in FIG. 7A in which no relative rotation is caused between the disk plate 100 and the hub 200, the axially extending portions 303a to 303d of the control plate 300 are housed in the corresponding groove portions 208a to 208d of the hub 200 at a position proximate to the wall portion 208w that defines the groove portions 208a to 208d, respectively. That is, a gap with the same size is formed between the axially extending portion 303a and the wall portion 208w, between the axially extending portion 303b and the wall portion 208w, between the axially extending portion 303c and the wall portion 208w, and between the axially extending portion 303d and the wall portion 208w, and each of the axially extending portions 303a to 303d does not abut against the wall portion 208w.

Next, FIG. 7B illustrates a state in which relative rotation is caused between the disk plate 100 and the hub 200 from the state in FIG. 7A to cause torsion of θ1° to the positive side. The positive side refers to the case where the hub 200 is rotated (moved) in the R direction (clockwise direction in FIG. 7B) relative to the disk plate 100, for example. In this case, the hub 200 is rotated relative to the disk plate 100 while distorting the first elastic members 410. At torsion angles of 0° to θ1°, the size of the gap between each of the axially extending portions 303a to 303d and the corresponding wall portion 208w is gradually increased, and therefore the two (the axially extending portion 303 and the wall portion 208w) still do not abut against each other. Thus, the control plate 300 is not affected by the rotation of the hub 200 relative to the disk plate 100, and is not rotated relative to the disk plate 100. On the other hand, the control plate 300 is rotated relative to the hub 200 (the hub 200 is rotated relative to the control plate 300).

In this case (the state in FIG. 7A to the state in FIG. 7B), as discussed above with reference to FIG. 3, the third sliding torque discussed above is generated through the sliding between the second surface 502y of the thrust member 500 rotated together with the disk plate 100 and the hub 200 (disk portion 205). The second sliding torque is generated with the second sliding surface 702a of the second sliding portion 700 slid with respect to the hub 200 (disk portion 205) based on the relative rotation between the hub 200 and the control plate 300. As discussed above, when the second sliding portion 700 is rotatable relative to the control plate 300, the second sliding torque discussed above may be generated through the sliding between the sliding surface 702b of the second sliding portion 700 and the radially extending portion 302 (radially extending portions 302a to 302d) of the control plate 300.

In the state in FIG. 7A to the state in FIG. 7B, as described above, the resultant torque of the third sliding torque and the second sliding torque is generated as hysteresis torque, and the hysteresis torque in this case corresponds to "small hysteresis torque".

Next, FIG. 7C illustrates a state in which the rotation of the hub 200 relative to the disk plate 100 is further increased from the state in FIG. 7B to cause torsion of θ2° to the positive side. In this case, the hub 200 is rotated relative to the disk plate 100 while further distorting the first elastic members 410. At a torsion angle of θ2°, each of the protruding portions 207a to 207d of the hub 200 abuts against the regulating portion 106 provided on the lining plate 101. Consequently, relative rotation of the hub 200 to the positive side by more than θ2° is regulated, and therefore the torsion angle of θ2° can be grasped as the maximum torsion angle to the positive side.

At torsion angles of θ1° to θ2°, the size of the gap between each of the axially extending portions 303a to 303d and the corresponding wall portion 208w is further increased, and therefore the two still do not abut against each other. Thus, the control plate 300 is not affected by the rotation of the hub 200 relative to the disk plate 100, and is not rotated relative to the disk plate 100. On the other hand, the control plate 300 is rotated relative to the hub 200 (the hub 200 is rotated relative to the control plate 300).

Also in this case (the state in FIG. 7B to the state in FIG. 7C), the third sliding torque and the second sliding torque are generated, as when a transition is made from the state in FIG. 7A to the state in FIG. 7B. Thus, "small hysteresis torque" is generated also in the state in FIG. 7B to the state in FIG. 7C.

Next, FIG. 7D illustrates a state in which relative rotation is caused between the disk plate 100 and the hub 200 from the state in FIG. 7A to cause torsion of θ3° to the negative side. The negative side refers to the case where the hub 200 is rotated (moved) in the L direction (counterclockwise direction in FIG. 7D) relative to the disk plate 100, for example. In this case, the hub 200 is rotated relative to the disk plate 100 while distorting the first elastic members 410. At torsion angles of 0° to θ3°, the size of the gap between each of the axially extending portions 303a to 303d and the corresponding wall portion 208w is gradually reduced, and the two abut against each other (the gap is eliminated) at a torsion angle of θ3°. Thus, at torsion angles of 0° to θ3°, the control plate 300 is not affected by the rotation of the hub 200 relative to the disk plate 100, and still is not rotated relative to the disk plate 100. On the other hand, the control plate 300 is rotated relative to the hub 200 (the hub 200 is rotated relative to the control plate 300).

Each of the radially extending portions 302a to 302d of the control plate 300 basically abuts against the elastic mechanism portion 400 in each of the regions I to IV. For example, each of the radially extending portions 302a to 302d abuts against the elastic mechanism portion 400 at all times when the hub 200 is not rotated relative to the disk plate 100 (state in FIG. 7A) and when the hub 200 is rotated relative to the disk plate 100 to the positive side (states in FIGS. 7B and 7C). As the torsion angle is varied from 0° to θ3°, however, the relationship of abutment is sequentially resolved. That is, at torsion angles of 0° to θ3°, a gap is formed between each of the radially extending portions 302a to 302d of the control plate 300 and the first elastic member 410 (elastic mechanism portion 400), and the size of the gap is sequentially increased. This is made in conjunction with the gap between each of the axially extending portions 303a to 303d and the wall portion 208w being eliminated as discussed above.

Also in this case (the state in FIG. 7A to the state in FIG. 7D), the third sliding torque and the second sliding torque discussed above are generated, as when a transition is made from the state in FIG. 7A to the state in FIG. 7B. Thus, "small hysteresis torque" is generated also in the state in FIG. 7A to the state in FIG. 7D.

Next, FIG. 7E illustrates a state in which the rotation of the hub 200 relative to the disk plate 100 is further increased from the state in FIG. 7D to cause torsion of θ4° to the negative side. In this case, the hub 200 is rotated relative to the disk plate 100 while further distorting the first elastic members 410. At a torsion angle of θ4°, each of the protruding portions 207a to 207d of the hub 200 abuts against the regulating portion 106 provided on the lining plate 101. Consequently, relative rotation of the hub 200 to the negative side by more than θ4° is regulated, and therefore the torsion angle of θ4° can be grasped as the maximum torsion angle to the negative side. In this case, the gap formed in the state in FIG. 7D is still formed between each of the radially extending portions 302a to 302d of the control plate 300 and the elastic mechanism portion 400 (first elastic member 410).

At torsion angles of θ3° to θ4°, each of the axially extending portions 303a to 303d and the corresponding wall portion 208w abut against each other. Thus, the control plate 300 (axially extending portions 303a to 303d) is rotated in the L direction relative to the disk plate 100 together with the hub 200 (integrally with the hub 200) as guided by the hub 200 (wall portion 208w).

Also in this case (the state in FIG. 7D to the state in FIG. 7E), the disk plate 100 and the hub 200 are rotated relative to each other, and therefore the third sliding torque discussed above is generated, as when a transition is made from the state in FIG. 7A to the state in FIG. 7B. In this case, the control plate 300 is also rotated relative to the disk plate 100, and therefore the first sliding torque discussed above is generated between the first sliding surface 602a of the first sliding portion 600 and the radially extending portion 302 (radially extending portions 302a to 302d) of the control plate 300 as discussed above. In this case, the hub 200 and the control plate 300 are rotated together with each other, and therefore the second sliding torque is not generated. The first sliding torque generated in this case is set in advance to be larger than the second sliding torque. Such setting is made by adjusting, as appropriate, the friction coefficients of the first sliding surface 602a and the radially extending portions 302a to 302d that generate the first sliding torque by any method discussed above.

In the state in FIG. 7D to the state in FIG. 7E, from the above, the resultant torque of the third sliding torque and the first sliding torque is generated as hysteresis torque, and the hysteresis torque in this case corresponds to "large hysteresis torque".

Next, FIG. 7F illustrates a state in which the rotation of the hub 200 relative to the disk plate 100 is being resolved from the state in FIG. 7E, in the middle of a transition from a maximum torsion angle of θ4° to a torsion angle of 0° on the negative side. In this case, the hub 200 is relatively moved in the R direction toward a torsion angle of 0° while gradually resolving the torsion of the first elastic member 410. That is, the torsion angle in the state in FIG. 7F can be considered to be a torsion angle between θ3° and θ4°, for example.

In this case, first, when the hub 200 is relatively moved in the R direction from a torsion angle of θ4° (moved so as to resolve the relative rotation in the L direction), the relationship of abutment between each of the axially extending portions 303a to 303d and the corresponding wall portion 208w is resolved, and a gap is sequentially formed therebetween again. That is, rotation of the control plate 300 in the R direction (rotation relative to the disk plate 100) may not be guided by the hub 200. Thus, a slight time difference is caused between the timing when the rotation of the hub 200 relative to the disk plate 100 to the negative side is resolved and the timing when the rotation of the control plate 300 relative to the disk plate 100 to the negative side is resolved.

When the hub 200 is relatively moved in the R direction by a predetermined angle (the predetermined angle is defined as α°, for example) in order to resolve the relative rotation to the negative side from a torsion angle of θ4° prior to the control plate 300 (without guiding the control plate 300), the gap formed in the state in FIG. 7D (and FIG. 7E) between each of the radially extending portions 302a to 302d of the control plate 300 and the elastic mechanism portion 400 is gradually reduced to be finally eliminated. Consequently, each of the radially extending portions 302a to 302d of the control plate 300 and the elastic mechanism portion 400 abut against each other again. In this state, the elastic mechanism portion 400 is still distorted, and therefore the elastic mechanism portion 400 presses (biases) the control plate 300 in the R direction. Consequently, the control plate 300 is now rotated in the R direction relative to the disk plate 100 based on a biasing force due to the distortion of the elastic mechanism portion 400.

The above flow will be further described. At torsion angles of θ4° to θ4−α°, only the hub 200 is rotated in the R direction relative to the disk plate 100, and therefore the third sliding torque and the second sliding torque are generated as when a transition is made from the state in FIG. 7A to the state in FIG. 7B. That is, "small hysteresis torque" is generated. At torsion angles of θ4−α° to 0°, on the other hand, not only the hub 200 but also the control plate 300 is rotated in the R direction relative to the disk plate 100, and therefore the third sliding torque and the first sliding torque are generated as when a transition is made from the state in FIG. 7D to the state in FIG. 7E. That is, "large hysteresis torque" is generated.

Based on the flow of operation of the damper device 1 described above with reference to FIGS. 7A to 7F, the torsional characteristics of the damper device 1 are as indicated in FIG. 8.

The "large hysteresis torque" generated on only the negative side as discussed above, that is, hysteresis torque obtained by adding the first sliding torque and the third sliding torque, is suitably used to absorb torque fluctuations caused when an engine of a hybrid vehicle is started under any condition in a state in which the vehicle is driven by only a motor with the engine stationary, for example. On the positive side, as discussed above, the "small hysteresis torque", that is, hysteresis torque obtained by adding the second sliding torque and the third sliding torque, can be generated. In this manner, the damper device 1 according to the first embodiment can render the axial length of the damper device 1 short by using a single control plate 300, generate relatively small hysteresis torque on the positive side and relatively large hysteresis torque on the negative side, and stably generate a variety of hysteresis torques. The damper device 1 according to the first embodiment generates first sliding torque on the radially extending portion 302 of the control plate 300 via the first sliding portion 600. Thus, the damper device 1 can be designed relatively easily from the viewpoint of the shape, structure, strength, etc. of the control plate 300.

3. Modifications

3-1. Second Embodiment

Figure 9:
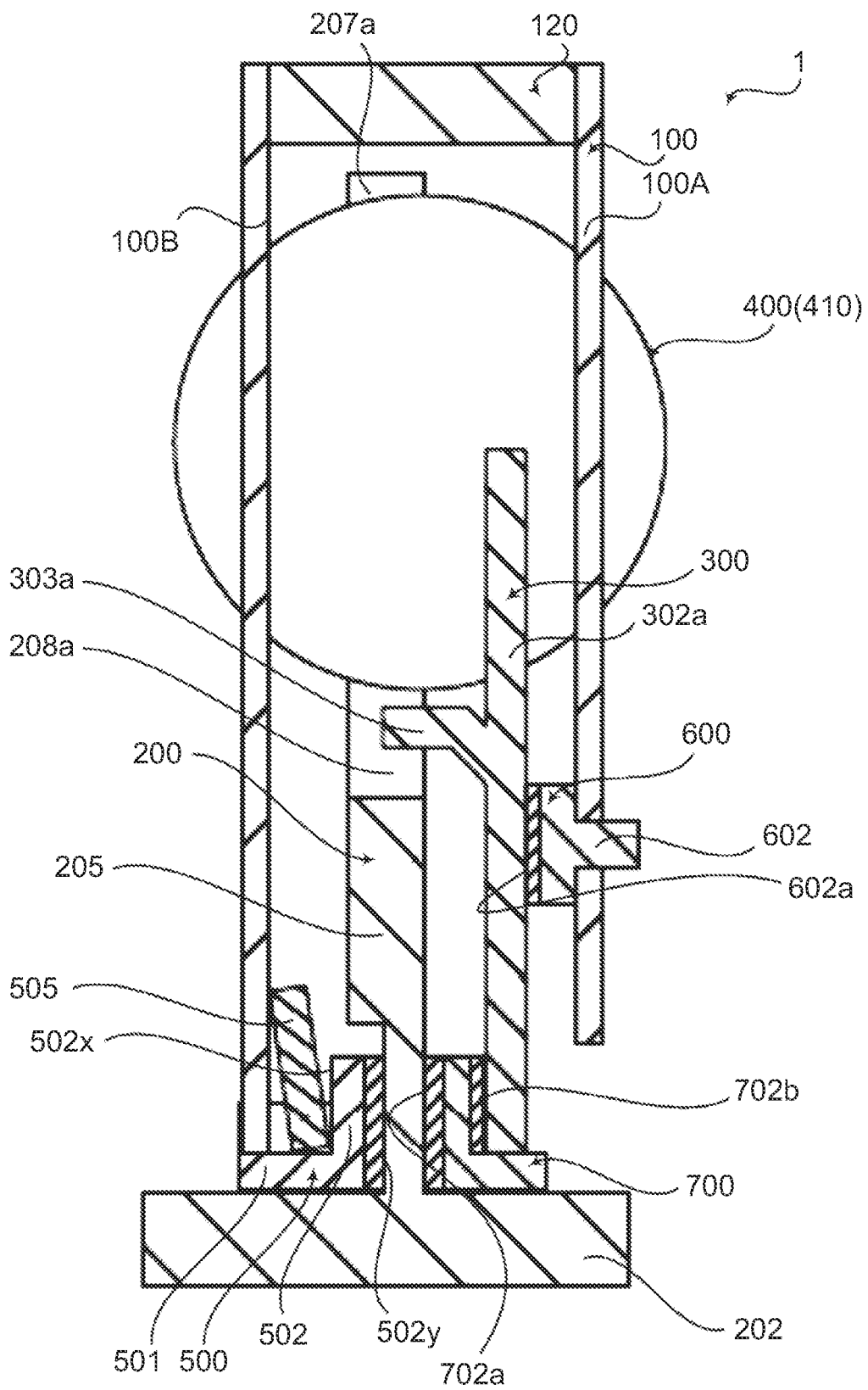
FIG. 9 is a schematic sectional view schematically illustrating the configuration of a damper device according to a second embodiment.

Next, the configuration of a damper device 1 according to a second embodiment will be described with reference to FIG. 9. FIG. 9 is a schematic sectional view schematically illustrating the configuration of the damper device 1 according to the second embodiment. FIG. 9 indicates in a simple manner that the damper device 1 according to the second embodiment has the following configuration that is different from that of the damper device 1 according to the first embodiment, focusing on the region I. Thus, while some constituent elements that are common to the damper device 1 according to the first embodiment illustrated in FIG. 3 etc. and the damper device 1 according to the second embodiment illustrated in FIG. 9 are expressed slightly differently in FIG. 9 for convenience, it should be understood that the shape etc. of the constituent elements according to the two embodiments are common unless specifically described otherwise, except for the following different configuration.

While the configuration of the damper device 1 according to the second embodiment is generally the same as that of the damper device 1 according to the first embodiment discussed above, the configuration of the thrust member 500 and the first sliding portion 600 is different from that according to the first embodiment discussed above. Components of the damper device 1 according to the second embodiment that are the same as those of the damper device 1 according to the first embodiment will not be described in detail.

The thrust member 500 of the damper device 1 according to the second embodiment further includes, in addition to an integral component constituted from the substantially cylindrical fitting portion 501 and the substantially annular main portion 502 discussed above, a fourth elastic member 505 that biases the integral component in the direction of moving closer to the hub 200 (in the rightward direction on the drawing sheet of FIG. 9). While a commonly known disk spring can be used as the fourth elastic member 505, this is not limiting.

On the other hand, the first sliding portion 600 of the damper device 1 according to the second embodiment does not include the second elastic member 604 which is a constituent element in the first embodiment, and is composed of only the plate portion 602.

In the damper device 1 according to the second embodiment configured as described above, the second surface 502y of the thrust member 500 is pressed against the hub 200 (disk portion 205) by the biasing force of the fourth elastic member 505. Consequently, it is possible to generate the third sliding torque discussed above reliably and efficiently when the disk plate 100 and the hub 200 are rotated relative to each other.

On the other hand, as the fourth elastic member 505 biases the second surface 502y in the direction of moving closer to the hub 200, a reaction force related to the biasing is transferred from the fourth elastic member 505 to the second plate 100B in conjunction with the biasing. Consequently, the second plate 100B is slightly biased in the direction of moving away from the hub 200 (in the leftward direction on the drawing sheet of FIG. 9). In conjunction with the biasing, the first plate 100A integrated with the second plate 100B via the rivets 120 is also slightly biased in the direction of moving closer to the control plate 300 (in the leftward direction on the drawing sheet of FIG. 9). The biasing force transferred to the first plate 100A may be replaced with the biasing force applied by the second elastic member 604 according to the first embodiment. Thus, with the first sliding portion 600 of the damper device 1 according to the second embodiment, it is possible to generate first sliding torque between the first sliding surface 602a of the first sliding portion 600 and the radially extending portion 302 of the control plate 300, even if the second elastic member 604 which is a constituent element in the first embodiment is omitted.

3-2. Third Embodiment

Figure 10:
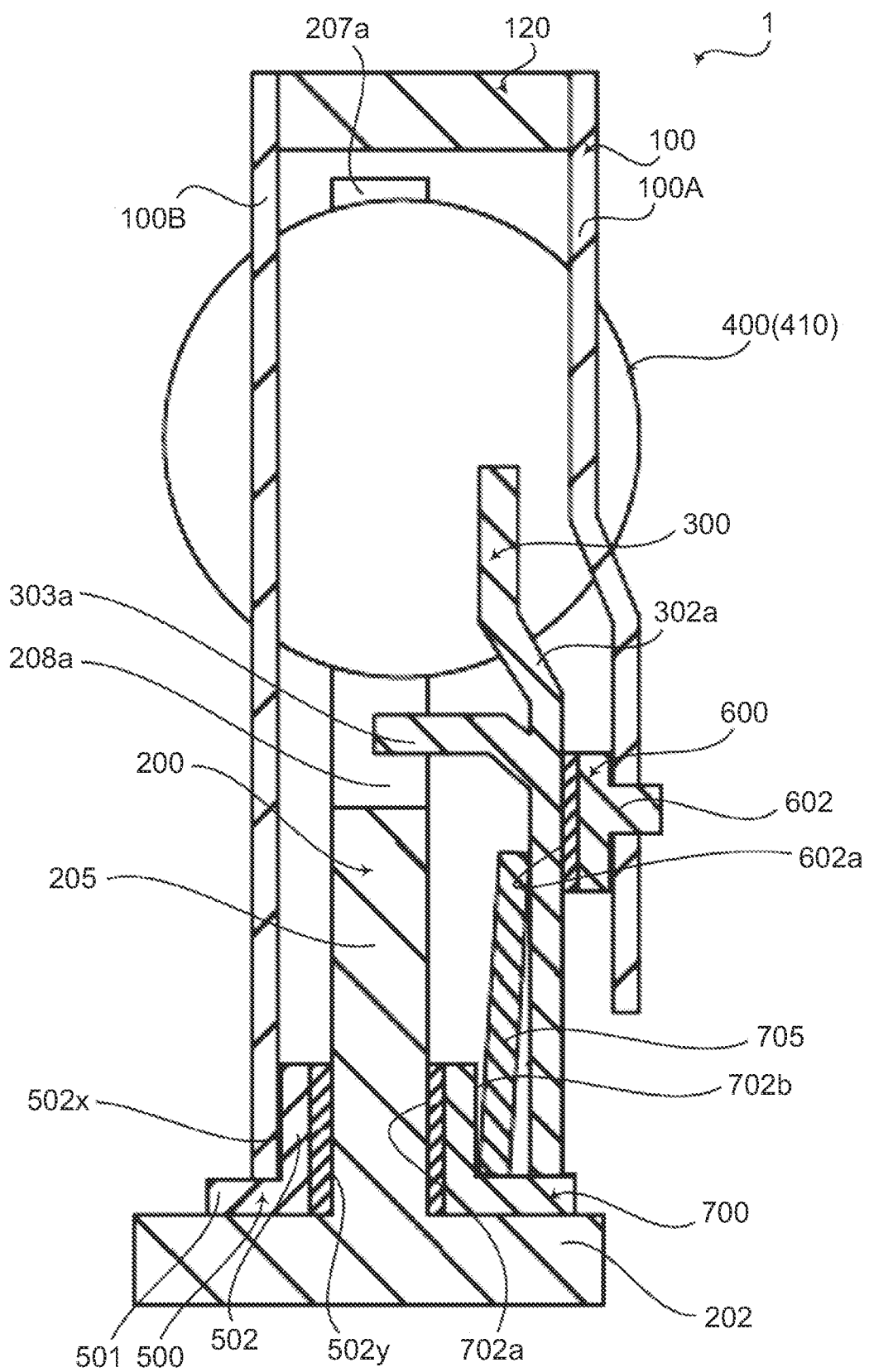
FIG. 10 is a schematic sectional view schematically illustrating the configuration of a damper device according to a third embodiment.

Next, the configuration of a damper device 1 according to a third embodiment will be described with reference to FIG. 10. FIG. 10 is a schematic sectional view schematically illustrating the configuration of the damper device 1 according to the third embodiment. FIG. 10 indicates in a simple manner that the damper device 1 according to the third embodiment has the following configuration that is different from that of the damper device 1 according to the first embodiment, focusing on the region I. Thus, while some constituent elements that are common to the damper device 1 according to the first embodiment illustrated in FIG. 3 etc. and the damper device 1 according to the third embodiment illustrated in FIG. 10 are expressed slightly differently in FIG. 10 for convenience, it should be understood that the shape etc. of the constituent elements according to the two embodiments are common unless specifically described otherwise, except for the following different configuration.

While the configuration of the damper device 1 according to the third embodiment is generally the same as that of the damper device 1 according to the first embodiment discussed above, the configuration of the first sliding portion 600 and the second sliding portion 700 is different from that according to the first embodiment discussed above. Components of the damper device 1 according to the third embodiment that are the same as those of the damper device 1 according to the first embodiment will not be described in detail.

The second sliding portion 700 of the damper device 1 according to the third embodiment further includes, in addition to an integral component that includes the second sliding surface 702a (and 702b) in a substantially annular shape, a third elastic member 705 that biases the integral component in the direction of moving closer to the hub 200 (in the leftward direction on the drawing sheet of FIG. 10). While a commonly known disk spring can be used as the third elastic member 705, this is not limiting.

On the other hand, the first sliding portion 600 of the damper device 1 according to the third embodiment does not include the second elastic member 604 which is a constituent element in the first embodiment, and is composed of only the plate portion 602.

In the damper device 1 according to the third embodiment configured as described above, the second sliding surface 702a of the second sliding portion 700 is pressed against the hub 200 (disk portion 205) by the biasing force of the third elastic member 705. Consequently, it is possible to generate the second sliding torque discussed above reliably and efficiently when the disk plate 100 and the hub 200 are rotated relative to each other and the hub 200 is rotated relative to the control plate 300 (the control plate 300 is rotated relative to the hub 200).

On the other hand, as the third elastic member 705 biases the second sliding surface 702a in the direction of pressing the second sliding surface 702a against the hub 200, a reaction force related to the biasing is transferred from the third elastic member 705 to the control plate 300 in conjunction with the biasing. Consequently, the control plate 300 is slightly biased in the direction of moving closer to the first plate 100A (in the rightward direction on the drawing sheet of FIG. 10). Consequently, it is possible to generate first sliding torque reliably and efficiently with the radially extending portion 302 of the control plate 300 pressed against the first sliding surface 602a of the first sliding portion 600 in the damper device 1 according to the third embodiment. In this configuration, the control plate 300 is biased in the direction of moving closer to the first plate 100A. Therefore, it is possible to generate first sliding torque between the first sliding surface 602a of the first sliding portion 600 and the radially extending portion 302 of the control plate 300, even if the second elastic member 604 which is a constituent element in the first embodiment is omitted.

3-3. Fourth Embodiment

Figure 11:
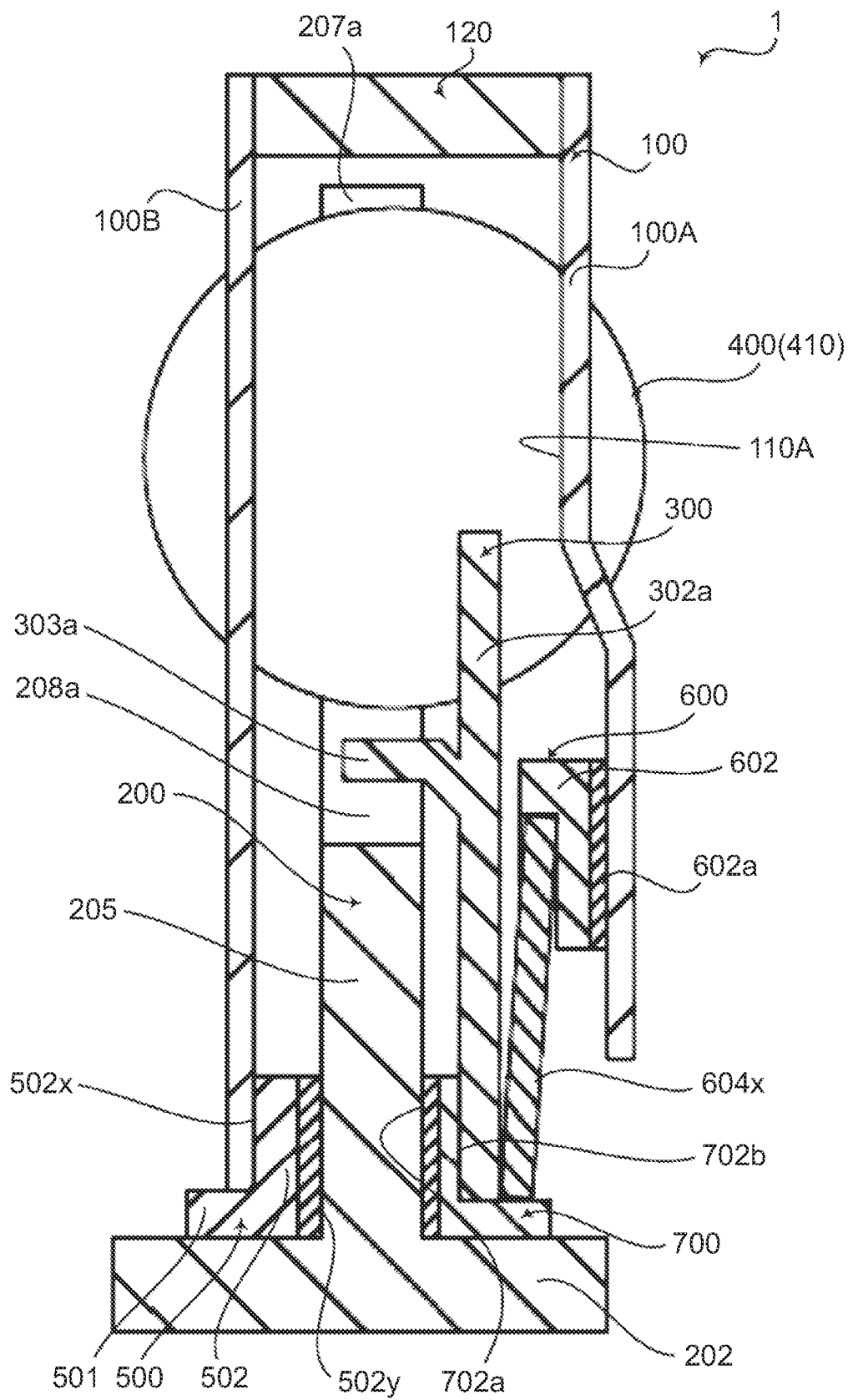
FIG. 11 is a schematic sectional view schematically illustrating the configuration of a damper device according to a fourth embodiment.

Next, the configuration of a damper device 1 according to a fourth embodiment will be described with reference to FIG. 11. FIG. 11 is a schematic sectional view schematically illustrating the configuration of the damper device 1 according to the fourth embodiment. FIG. 11 indicates in a simple manner that the damper device 1 according to the fourth embodiment has the following configuration that is different from that of the damper device 1 according to the first embodiment, focusing on the region I. Thus, while some constituent elements that are common to the damper device 1 according to the first embodiment illustrated in FIG. 3 etc. and the damper device 1 according to the fourth embodiment illustrated in FIG. 11 are expressed slightly differently in FIG. 11 for convenience, it should be understood that the shape etc. of the constituent elements according to the two embodiments are basically common, except for the following different configuration.

While the configuration of the damper device 1 according to the fourth embodiment is generally the same as that of the damper device 1 according to the first embodiment discussed above, the configuration of the first sliding portion 600 is different from that according to the first embodiment discussed above. Components of the damper device 1 according to the fourth embodiment that are the same as those of the damper device 1 according to the first embodiment will not be described in detail.

While the first sliding portion 600 of the damper device 1 according to the fourth embodiment is similar to that according to the first embodiment in being composed of the plate portion 602 and a second elastic member 604x (the second elastic member 604 in the first embodiment), the second elastic member 604x biases the plate portion 602 in the direction of moving closer to the first plate 100A (in the rightward direction on the drawing sheet of FIG. 11), rather than in the direction of moving closer to the control plate 300 (in the leftward direction on the drawing sheet of FIG. 11). The first sliding portion 600 of the damper device 1 according to the fourth embodiment is configured to be engaged with the control plate 300 (the plate portion 602 is engaged with the radially extending portion 302 of the control plate 300, for example), unlike the first embodiment. Thus, the first sliding portion 600 can be rotated together with the control plate 300. The second elastic member 604x may be the same as the second elastic member 604 according to the first embodiment.

In the damper device 1 according to the fourth embodiment configured as described above, the first sliding surface 602a of the first sliding portion 600 is pressed against the inner surface 110A of the first plate 100A when the control plate 300 and the disk plate 100 are rotated relative to each other (i.e. in the "predetermined case" discussed above). Thus, it is possible to generate first sliding torque reliably and efficiently between the first sliding surface 602a and the inner surface 110A of the first plate 100A. In the first embodiment, as illustrated in FIG. 3, a surface of the plate portion 602 that faces the control plate 300 is referred to as the "first sliding surface 602a". On the other hand, in the fourth embodiment, as illustrated in FIG. 11, a surface of the plate portion 602 that faces the first plate 100A is referred to as the "first sliding surface 602a". Thus, it should be understood that the first sliding surface 602a is a surface of the first sliding portion 600 that generates first sliding torque.

On the other hand, as the second elastic member 604x biases the first sliding surface 602a in the direction of moving closer to first plate 100A, a reaction force related to the biasing is transferred from the second elastic member 604x to the control plate 300 in conjunction with the biasing. Consequently, the control plate 300 is slightly biased in the direction of moving closer to the hub 200 (in the leftward direction on the drawing sheet of FIG. 11). Consequently, in the damper device 1 according to the fourth embodiment, the second sliding surface 702a of the second sliding portion 700 is pressed against the hub 200 (disk portion 205) by a reaction force generated in conjunction with the biasing force of the second elastic member 604x. Thus, it is possible to generate second sliding torque reliably and efficiently when the hub 200 and the control plate 300 are rotated relative to each other.

3-4. Fifth Embodiment

Figure 12:
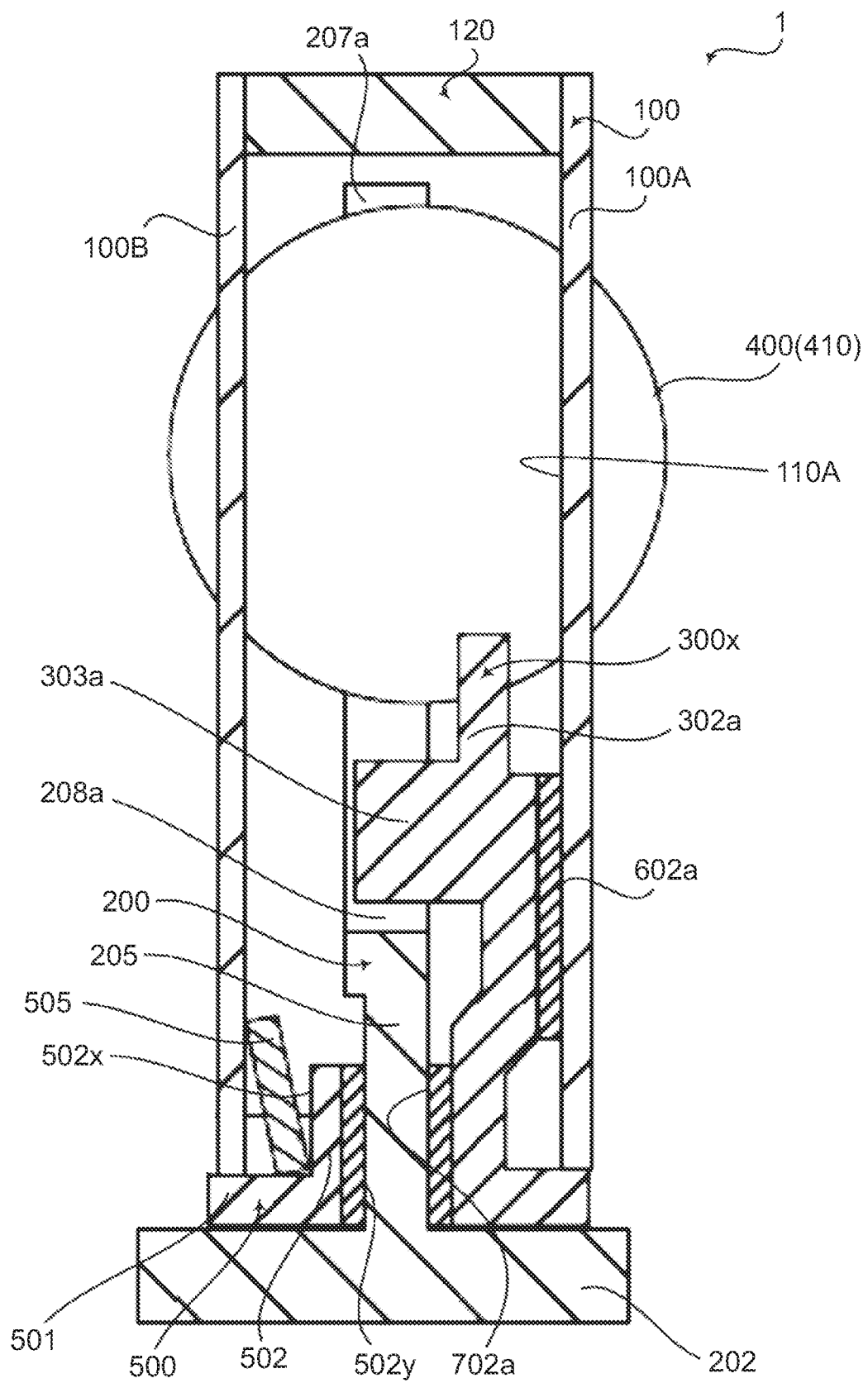
FIG. 12 is a schematic sectional view schematically illustrating the configuration of a damper device according to a fifth embodiment.

Next, the configuration of a damper device 1 according to a fifth embodiment will be described with reference to FIG. 12. FIG. 12 is a schematic sectional view schematically illustrating the configuration of the damper device 1 according to the fifth embodiment. FIG. 12 indicates in a simple manner that the damper device 1 according to the fifth embodiment has the following configuration that is different from that of the damper device 1 according to the first embodiment, focusing on the region I. Thus, while some constituent elements that are common to the damper device 1 according to the first embodiment illustrated in FIG. 3 etc. and the damper device 1 according to the fifth embodiment illustrated in FIG. 12 are expressed slightly differently in FIG. 12 for convenience, it should be understood that the shape etc. of the constituent elements according to the two embodiments are basically common, except for the following different configuration.

While the configuration of the damper device 1 according to the fifth embodiment is generally the same as that of the damper device 1 according to the first embodiment discussed above, the configuration of the thrust member 500, the first sliding portion 600, and the second sliding portion 700 is different from that according to the first embodiment discussed above. Components of the damper device 1 according to the fifth embodiment that are the same as those of the damper device 1 according to the first embodiment will not be described in detail.

As with the second embodiment, the thrust member 500 of the damper device 1 according to the fifth embodiment further includes, in addition to an integral component constituted from the substantially cylindrical fitting portion 501 and the substantially annular main portion 502 discussed above, a fourth elastic member 505 that biases the integral component in the direction of moving closer to the hub 200 (in the rightward direction on the drawing sheet of FIG. 12). While a commonly known disk spring can be used as the fourth elastic member 505, this is not limiting.

In the damper device 1 according to the fifth embodiment, further, the first sliding portion 600 and the second sliding portion 700 are formed integrally with the control plate 300. That is, the control plate 300, the first sliding portion 600, and the second sliding portion 700 are formed as one integral structure. The thus formed integral structure can be grasped as a control plate 300x (the control plate according to the fifth embodiment is referred to as a "control plate 300x" for convenience) that provides both the function of the first sliding portion 600 and the function of the second sliding portion 700.

Thus, the control plate 300x according to the fifth embodiment can include, on the radially extending portion 302, a first sliding surface 602a that is directly slid with respect to the inner surface 110A of the first plate 100A to generate first sliding torque, and a second sliding surface 702a that is directly slid with respect to the hub 200 (disk portion 205) to generate second sliding torque.

In the damper device 1 according to the fifth embodiment configured as described above, the second surface 502y of the thrust member 500 is pressed against the hub 200 (disk portion 205) by the biasing force of the fourth elastic member 505. Consequently, it is possible to generate the third sliding torque discussed above reliably and efficiently when the disk plate 100 and the hub 200 are rotated relative to each other.

On the other hand, as the fourth elastic member 505 biases the second surface 502y in the direction of moving closer to the hub 200, a reaction force related to the biasing is transferred from the fourth elastic member 505 to the second plate 100B in conjunction with the biasing. Consequently, the second plate 100B is slightly biased in the direction of moving away from the hub 200 (in the leftward direction on the drawing sheet of FIG. 12). In conjunction with the biasing, the first plate 100A integrated with the second plate 100B via the rivets 120 is also slightly biased in the direction of moving closer to the control plate 300 (in the leftward direction on the drawing sheet of FIG. 12). Consequently, the inner surface 110A of the first plate 100A is pressed against the first sliding surface 602a of the control plate 300x. Consequently, first sliding torque can be generated reliably and efficiently between the first sliding surface 602a of the control plate 300x and the inner surface 110A of the first plate 100A when the disk plate 100 and the control plate 300x are rotated relative to each other.

The second sliding surface 702a of the control plate 300x is pressed against the hub 200 (disk portion 205) in conjunction with the inner surface 110A of the first plate 100A being pressed against the first sliding surface 602a of the control plate 300x. Consequently, second sliding torque can be generated reliably and efficiently between the second sliding surface 702a of the control plate 300x and the hub 200 when the control plate 300x and the hub 200 are rotated relative to each other.

3-5. Sixth Embodiment

Figure 13:
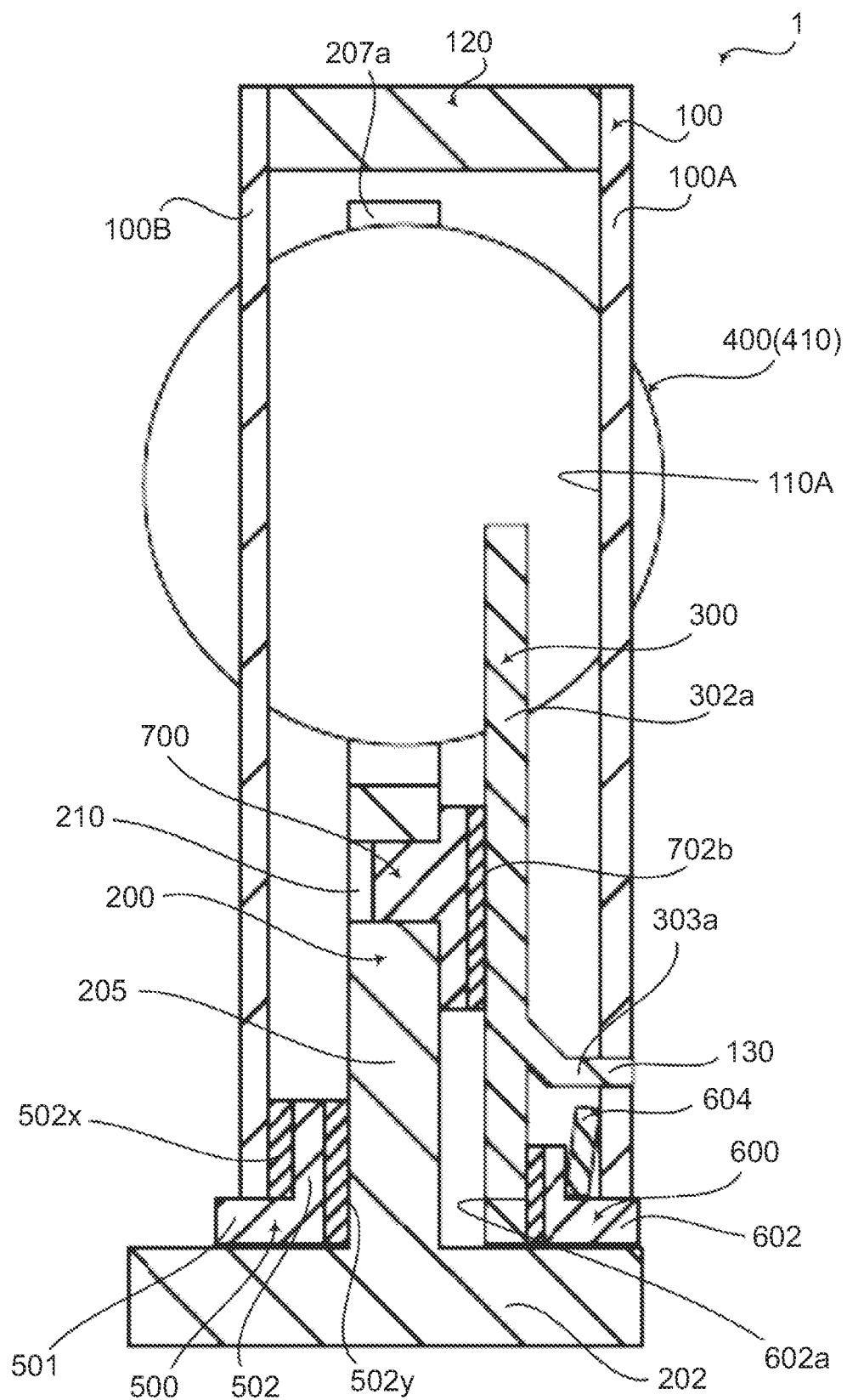
FIG. 13 is a schematic sectional view schematically illustrating the configuration of a damper device according to a sixth embodiment.
Figure 14:
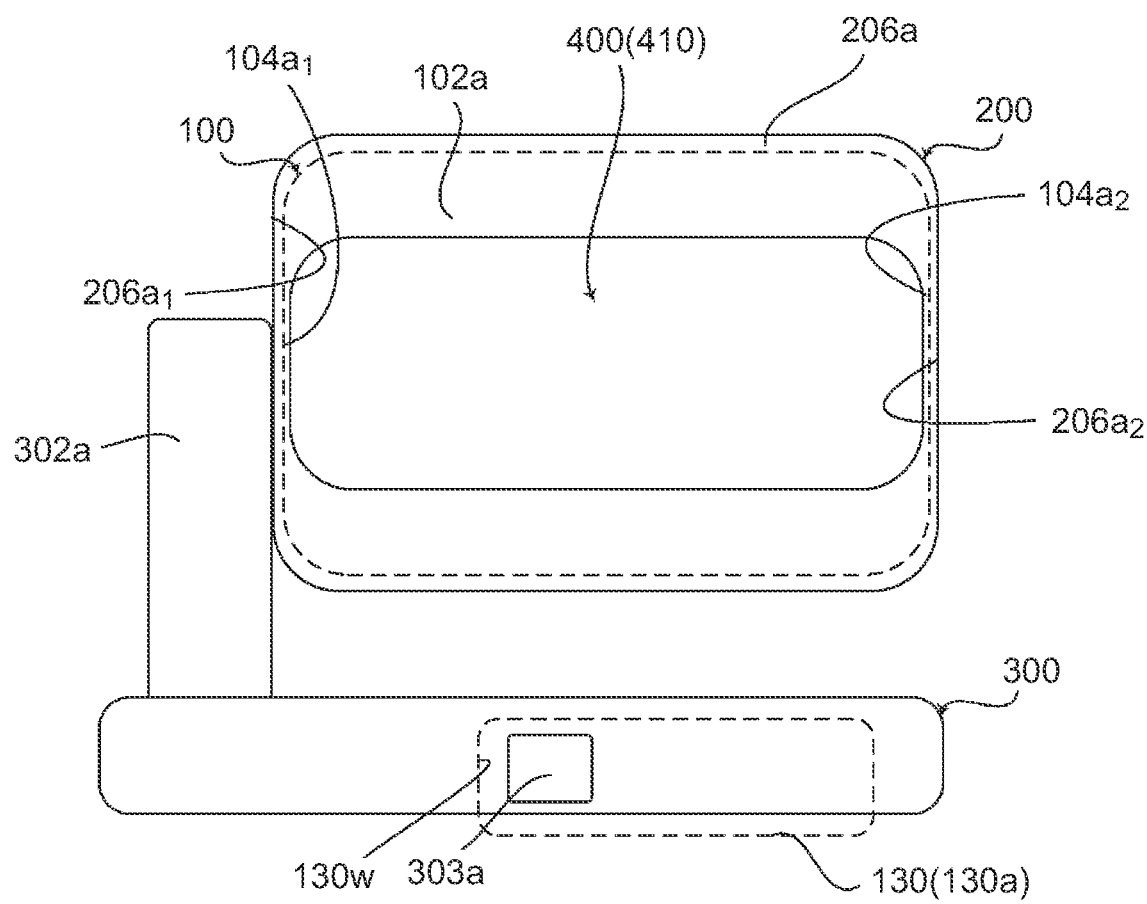
FIG. 14 is a schematic view schematically illustrating the relationship between a disk plate and a control plate in the damper device according to the sixth embodiment as enlarged.

Next, the configuration of a damper device 1 according to a sixth embodiment will be described with reference to FIGS. 13 and 14. FIG. 13 is a schematic sectional view schematically illustrating the configuration of the damper device 1 according to the sixth embodiment. FIG. 14 is a schematic view schematically illustrating the relationship between a disk plate 100 and a control plate 300 in the damper device 1 according to the sixth embodiment as enlarged. FIG. 13 indicates in a simple manner that the damper device 1 according to the sixth embodiment has the following configuration that is different from that of the damper device 1 according to the first embodiment, focusing on the region I. Thus, while some constituent elements that are common to the damper device 1 according to the first embodiment illustrated in FIG. 3 etc. and the damper device 1 according to the sixth embodiment illustrated in FIG. 13 are expressed slightly differently in FIG. 13 for convenience, it should be understood that the shape etc. of the constituent elements according to the two embodiments are basically common, except for the following different configuration.

While the configuration of the damper device 1 according to the sixth embodiment is generally the same as that of the damper device 1 according to the first embodiment discussed above, the configuration of the disk plate 100, the hub 200, the control plate 300, the first sliding portion 600, and the second sliding portion 700 is different from that according to the first embodiment discussed above. Components of the damper device 1 according to the sixth embodiment that are the same as those of the damper device 1 according to the first embodiment will not be described in detail.

The control plate 300 of the damper device 1 according to the sixth embodiment is configured such that the axially extending portions 303a to 303d are housed in the disk plate 100, rather than being housed in the groove portions 208a to 208d, respectively, of the hub 200, unlike the first embodiment. Specifically, as illustrated in FIG. 14, the first plate 100A of the damper device 1 according to the sixth embodiment is provided with a housing groove portion 130 (housing groove portions 130a to 130d) that houses each of the axially extending portions 303a to 303d in correlation with each of the regions I to IV. The housing groove portions 130a to 130d may be integrally provided on the radially inner side of the first housing region 102a, the second housing region 102b, the third housing region 102c, and the fourth housing region 102d, which are provided in the first plate 100A, respectively, as with the groove portions 208a to 208d according to the first embodiment which are provided continuously with the window holes 206a to 206d, respectively, of the hub 200, or may be independently provided in the first plate 100A. FIG. 14 illustrates an example in which the housing groove portion 130a is provided independently of the first housing region 102a.

In the sixth embodiment, as illustrated in FIG. 14, the axially extending portions 303a to 303d of the control plate 300 are housed at a position proximate to the wall portion 130w that defines the housing groove portions 130a to 130d with a gap with a predetermined size formed therefrom. This corresponds to the axially extending portions 303a to 303d being housed at a position proximate to the wall portion 208w in the first embodiment.

The groove portions 208a to 208d of the hub 200 of the damper device 1 according to the sixth embodiment may be omitted, since the function of housing the axially extending portions 303a to 303d of the control plate 300 is not required. On the other hand, as illustrated in FIG. 13, an engagement hole 210 in which the second sliding portion 700 is engaged is separately formed in the hub 200. Consequently, the second sliding portion 700 is configured to be engaged with the hub 200 so that the second sliding portion 700 can be rotated together with the hub 200.

The first sliding portion 600 of the damper device 1 according to the sixth embodiment is basically configured similarly to that according to the first embodiment, but is disposed at a position close to the rotational axis O.

The damper device 1 according to the sixth embodiment configured as described above basically operates similarly to that according to the first embodiment. The relationship between the control plate 300 and the hub 200 according to the first embodiment described with reference to FIGS. 7A to 7F is replaced with the relationship between the control plate 300 and the disk plate 100 (first plate 100A) in the sixth embodiment.

Specifically, a case where relative rotation is caused between the disk plate 100 and the hub 200 to cause torsion of 0° to θ1° to θ2° on the positive side as in FIGS. 7B and 7C discussed above is assumed. In this case, the hub 200 is rotated (moved) in the R direction (clockwise direction in FIG. 7B) relative to the disk plate 100, which is synonymous with the disk plate 100 being rotated (moved) in the L direction relative to the hub 200 when seen from a different viewpoint. In this case, in the sixth embodiment, the size of the gap between each of the axially extending portions 303a to 303d of the control plate 300 and the wall portion 130w of the corresponding one of the housing groove portions 130a to 130d is gradually increased so that the two do not abut against each other. Thus, the control plate 300 is not affected by the rotation of the disk plate 100 relative to the hub 200, and is not rotated relative to the hub 200. On the other hand, the control plate 300 is rotated relative to the disk plate 100 (the disk plate 100 is rotated relative to the control plate 300). Thus, first sliding torque is generated between the radially extending portion 302 of the control plate 300 and the first sliding surface 602a of the first sliding portion 600.

Next, a case where relative rotation is caused between the disk plate 100 and the hub 200 to cause torsion of 0° to θ3° on the negative side as in FIG. 7D discussed above is assumed. In this case, the hub 200 is rotated (moved) in the L direction (counterclockwise direction in FIG. 7B) relative to the disk plate 100, which is synonymous with the disk plate 100 being rotated (moved) in the R direction relative to the hub 200 when seen from a different viewpoint. In this case, in the sixth embodiment, the size of the gap between each of the axially extending portions 303a to 303d of the control plate 300 and the wall portion 130w of the corresponding one of the housing groove portions 130a to 130d is gradually reduced so that the two finally abut against each other at a torsion angle of θ3°. Thus, a gap is present between the axially extending portions 303a to 303d and the wall portions 130w also at torsion angles of 0° to θ3°, and therefore the control plate 300 is not affected by the rotation of the disk plate 100 relative to the hub 200, and is not rotated relative to the hub 200. On the other hand, the control plate 300 is rotated relative to the disk plate 100 (the disk plate 100 is rotated relative to the control plate 300). Thus, first sliding torque is generated between the radially extending portion 302 of the control plate 300 and the first sliding surface 602a of the first sliding portion 600.

Next, a case where relative rotation is caused between the disk plate 100 and the hub 200 to cause torsion of θ3° to θ4° on the negative side as in FIG. 7E discussed above is assumed. In this case, the hub 200 is rotated (moved) in the L direction (counterclockwise direction in FIG. 7B) relative to the disk plate 100, which is synonymous with the disk plate 100 being rotated (moved) in the R direction relative to the hub 200 when seen from a different viewpoint. In this case, in the sixth embodiment, each of the axially extending portions 303a to 303d of the control plate 300 and the wall portion 130w of the corresponding one of the housing groove portions 130a to 130d abut against each other. Thus, the control plate 300 is rotated together with the disk plate 100. Consequently, the control plate 300 is rotated relative to the hub 200, and second sliding torque is generated between the radially extending portions 302a to 302d of the control plate 300 and the second sliding surface 702b of the second sliding portion 700.

In the sixth embodiment, unlike the first embodiment, the second sliding torque is set to be larger than the first sliding torque.

In the sixth embodiment, the thrust member 500 generates third sliding torque, as in the first embodiment. Consequently, in the sixth embodiment, the resultant torque of the third sliding torque and the first sliding torque is used as "small hysteresis torque", and the resultant torque of the third sliding torque and the second sliding torque is used as "large hysteresis torque".

3-6. Seventh Embodiment

Figure 15:
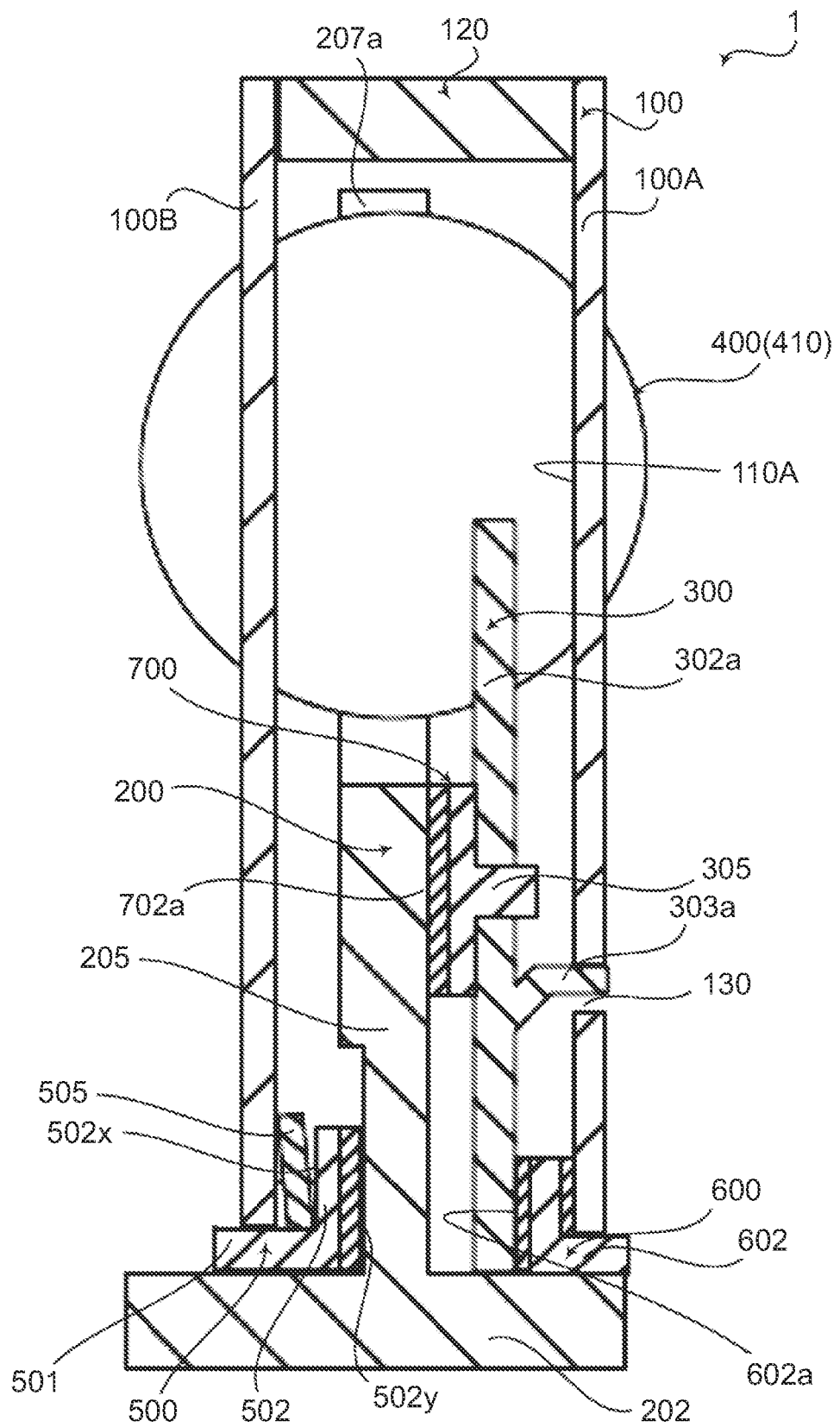
FIG. 15 is a schematic sectional view schematically illustrating the configuration of a damper device according to a seventh embodiment.

Next, the configuration of a damper device 1 according to a seventh embodiment will be described with reference to FIG. 15. FIG. 15 is a schematic sectional view schematically illustrating the configuration of the damper device 1 according to the seventh embodiment. FIG. 15 indicates in a simple manner that the damper device 1 according to the seventh embodiment has the following configuration that is different from that of the damper device 1 according to the first embodiment, focusing on the region I. Thus, while some constituent elements that are common to the damper device 1 according to the first embodiment illustrated in FIG. 3 etc. and the damper device 1 according to the seventh embodiment illustrated in FIG. 15 are expressed slightly differently in FIG. 15 for convenience, it should be understood that the shape etc. of the constituent elements according to the two embodiments are basically common, except for the following different configuration.

While the configuration of the damper device 1 according to the seventh embodiment is generally the same as that of the damper device 1 according to the first embodiment discussed above, the configuration of the disk plate 100, the hub 200, the control plate 300, the thrust member 500, the first sliding portion 600, and the second sliding portion 700 is different from that according to the first embodiment discussed above. On the other hand, the configuration of the damper device 1 according to the seventh embodiment is generally the same as that of the damper device 1 according to the sixth embodiment discussed above. Thus, portions of the damper device 1 according to the seventh embodiment that are different from the damper device 1 according to the sixth embodiment will be basically described mainly, and the other portions thereof will not be described in detail.

The thrust member 500 of the damper device 1 according to the seventh embodiment is provided with a fourth elastic member 505, as in the second embodiment. Consequently, the second surface 502y of the thrust member 500 is pressed against the hub 200 (disk portion 205) by the biasing force of the fourth elastic member 505, which makes it possible to generate the third sliding torque discussed above reliably and efficiently when the disk plate 100 and the hub 200 are rotated relative to each other.

As described in relation to the second embodiment discussed above, as a reaction force of the biasing force of the fourth elastic member 505 is transferred to the second plate 100B, the first plate 100A is biased in the direction of moving closer to the control plate 300 (in the leftward direction on the drawing sheet of FIG. 15). Consequently, the first plate 100A is pressed against the first sliding portion 600, and the control plate 300 is pressed against the first sliding portion 600. That is, the first sliding portion 600 according to the seventh embodiment does not include the second elastic member 604. Consequently, first sliding torque can be generated between the first plate 100A and the first sliding portion 600 (first sliding surface 602a) and between the first sliding portion 600 (first sliding surface 602a) and the radially extending portion 302 of the control plate 300 when the control plate 300 and the disk plate 100 are rotated relative to each other.

On the other hand, the second sliding portion 700 of the damper device 1 according to the seventh embodiment is configured to be engaged with the control plate 300 to be rotatable together with the control plate 300, unlike the sixth embodiment. Specifically, in the seventh embodiment, the second sliding portion 700 is configured to be engaged (fitted) in an engagement hole 305 provided in the radially extending portion 302 of the control plate 300. With this configuration, second sliding torque can be generated between the hub 200 (disk portion 205) and the second sliding surface 702a of the second sliding portion 700 when the control plate 300 and the hub 200 are rotated relative to each other, as in the sixth embodiment.

In the seventh embodiment, as in the sixth embodiment, the second sliding torque is set to be larger than the first sliding torque. In the seventh embodiment, the resultant torque of the third sliding torque and the first sliding torque is used as "small hysteresis torque", and the resultant torque of the third sliding torque and the second sliding torque is used as "large hysteresis torque".

3-7. Eighth Embodiment

Figure 16:
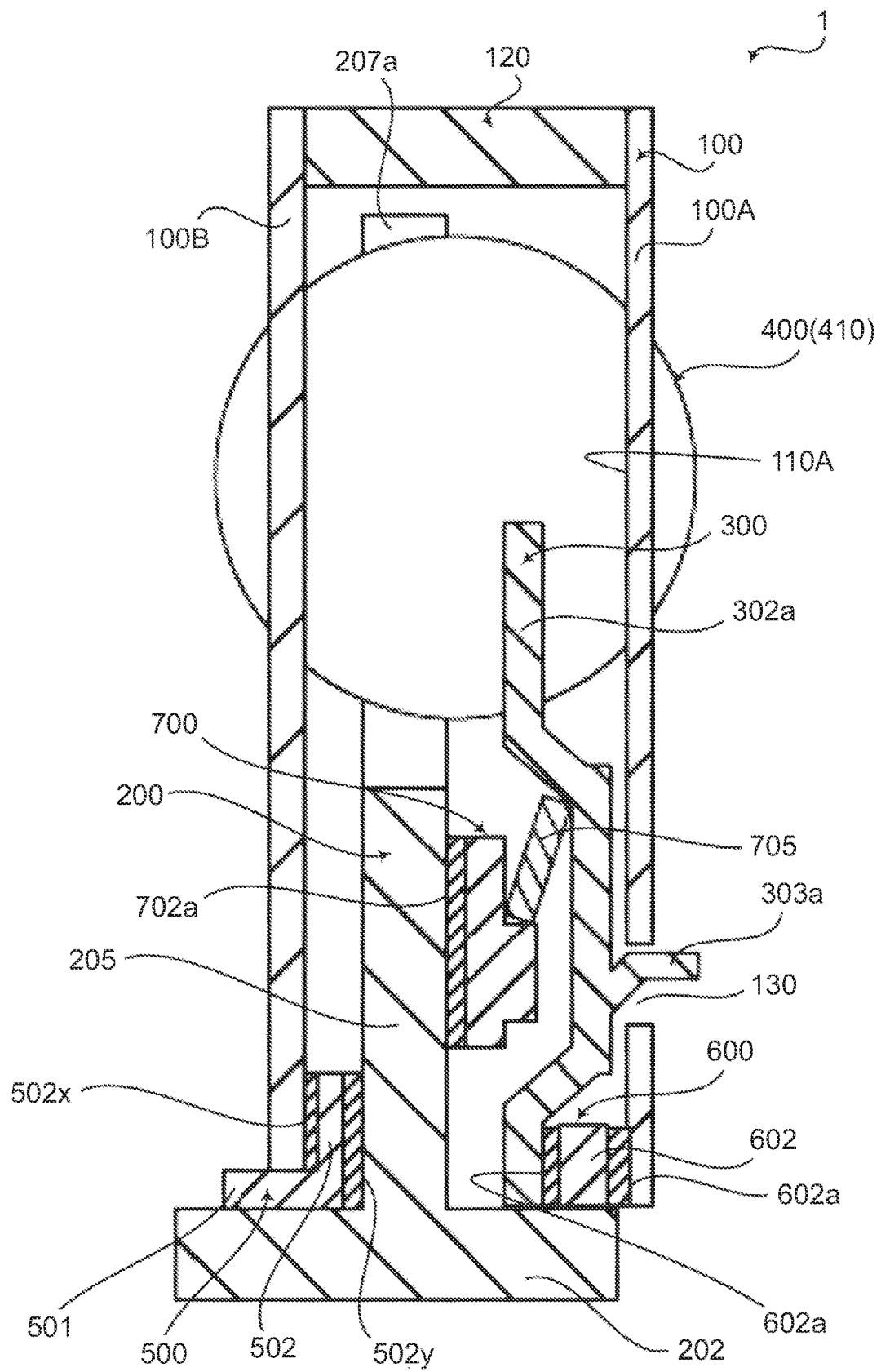
FIG. 16 is a schematic sectional view schematically illustrating the configuration of a damper device according to an eighth embodiment.

Next, the configuration of a damper device 1 according to an eighth embodiment will be described with reference to FIG. 16. FIG. 16 is a schematic sectional view schematically illustrating the configuration of the damper device 1 according to the eighth embodiment. FIG. 16 indicates in a simple manner that the damper device 1 according to the eighth embodiment has the following configuration that is different from that of the damper device 1 according to the first embodiment, focusing on the region I. Thus, while some constituent elements that are common to the damper device 1 according to the first embodiment illustrated in FIG. 3 etc. and the damper device 1 according to the eighth embodiment illustrated in FIG. 16 are expressed slightly differently in FIG. 16 for convenience, it should be understood that the shape etc. of the constituent elements according to the two embodiments are basically common, except for the following different configuration.

While the configuration of the damper device 1 according to the eighth embodiment is generally the same as that of the damper device 1 according to the first embodiment discussed above, the configuration of the disk plate 100, the hub 200, the control plate 300, the first sliding portion 600, and the second sliding portion 700 is different from that according to the first embodiment discussed above. On the other hand, the configuration of the damper device 1 according to the eighth embodiment is generally the same as that of the damper device 1 according to the sixth embodiment discussed above. Thus, portions of the damper device 1 according to the eighth embodiment that are different from the damper device 1 according to the sixth embodiment will be basically described mainly, and the other portions thereof will not be described in detail.

The second sliding portion 700 of the damper device 1 according to the eighth embodiment is provided with a third elastic member 705 that biases the second sliding surface 702a in the direction of pressing the second sliding surface 702a against the hub 200 (disk portion 205) (in the leftward direction on the drawing sheet of FIG. 16), as in the third embodiment. In this event, the second sliding portion 700 may be engaged with the control plate 300. Consequently, second sliding torque can be generated reliably and efficiently between the hub 200 and the second sliding surface 702a when the control plate 300 and the hub 200 are rotated relative to each other.

On the other hand, as a reaction force of the biasing force of the third elastic member 705 is transferred to the control plate 300, the radially extending portion 302 of the control plate 300 is pressed (biased) against the first sliding portion 600. In conjunction with the pressing, further, the first sliding portion 600 is pressed against the first plate 100A. Consequently, first sliding torque can be generated between the radially extending portion 302 of the control plate 300 and the first sliding portion 600 (first sliding surface 602a) and between the first sliding portion 600 (first sliding surface 602a) and the inner surface 110A of the first plate 100A when the control plate 300 and the disk plate 100 are rotated relative to each other.

Further, the first plate 100A is biased in the direction of moving away from the control plate 300 (in the rightward direction on the drawing sheet of FIG. 16) based on the reaction force discussed above, and the second plate 100B integrated with the first plate 100A via the rivets 120 is biased in the direction of moving closer to the hub 200 (in the rightward direction on the drawing sheet of FIG. 16). Consequently, the third sliding torque discussed above can be generated reliably and efficiently on the first surface 502x and the second surface 502y of the thrust member 500.

In the eighth embodiment, as in the sixth embodiment, the second sliding torque is set to be larger than the first sliding torque. In the eighth embodiment, the resultant torque of the third sliding torque and the first sliding torque is used as "small hysteresis torque", and the resultant torque of the third sliding torque and the second sliding torque is used as "large hysteresis torque".

3-8. Ninth Embodiment

Figure 17:
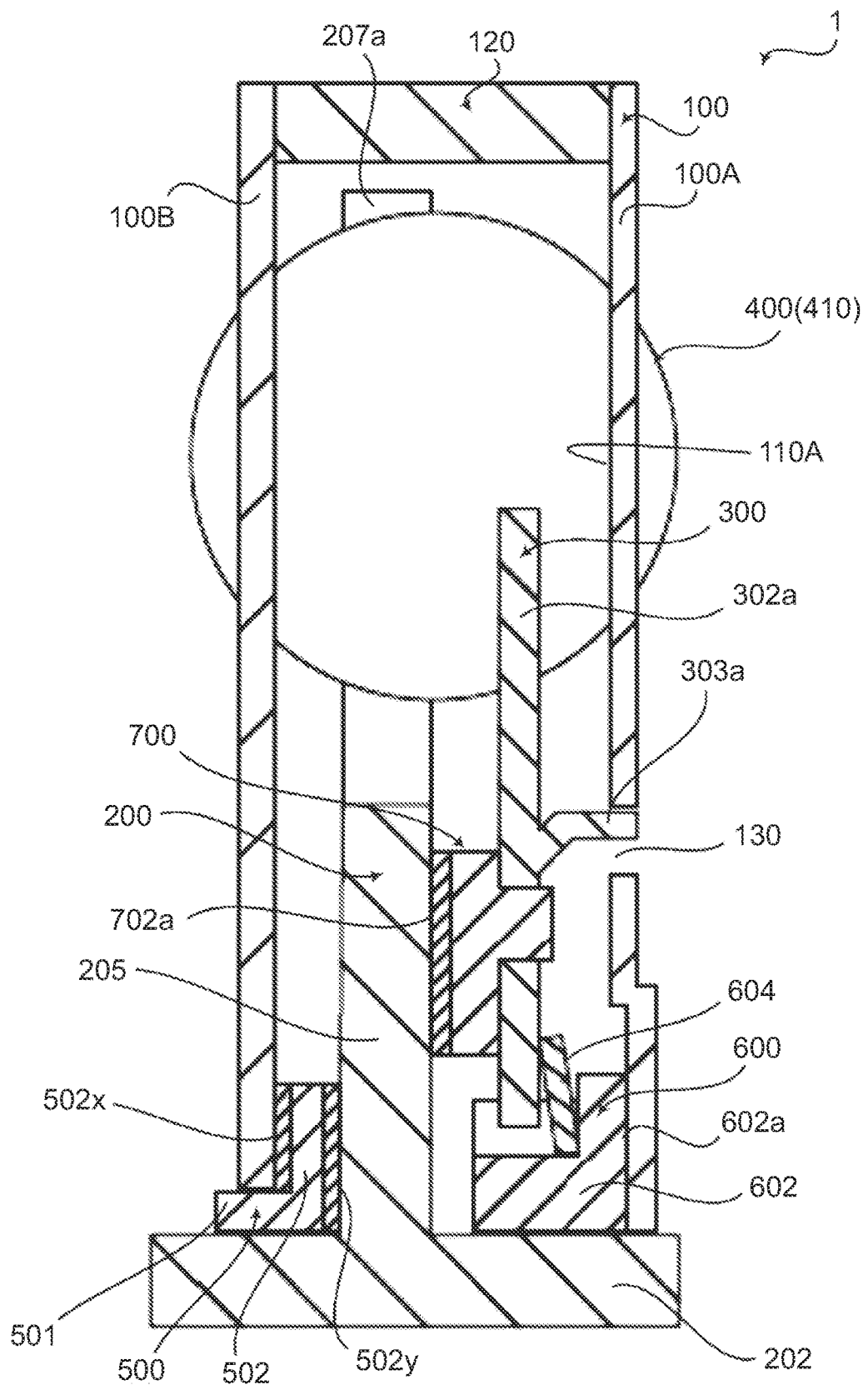
FIG. 17 is a schematic sectional view schematically illustrating the configuration of a damper device according to a ninth embodiment.

Next, the configuration of a damper device 1 according to a ninth embodiment will be described with reference to FIG. 17. FIG. 17 is a schematic sectional view schematically illustrating the configuration of the damper device 1 according to the ninth embodiment. FIG. 17 indicates in a simple manner that the damper device 1 according to the ninth embodiment has the following configuration that is different from that of the damper device 1 according to the first embodiment, focusing on the region I. Thus, while some constituent elements that are common to the damper device 1 according to the first embodiment illustrated in FIG. 3 etc. and the damper device 1 according to the ninth embodiment illustrated in FIG. 17 are expressed slightly differently in FIG. 17 for convenience, it should be understood that the shape etc. of the constituent elements according to the two embodiments are basically common, except for the following different configuration.

While the configuration of the damper device 1 according to the ninth embodiment is generally the same as that of the damper device 1 according to the first embodiment discussed above, the configuration of the disk plate 100, the hub 200, the control plate 300, the first sliding portion 600, and the second sliding portion 700 is different from that according to the first embodiment discussed above. On the other hand, the configuration of the damper device 1 according to the ninth embodiment is generally the same as that of the damper device 1 according to the seventh embodiment discussed above. Thus, portions of the damper device 1 according to the ninth embodiment that are different from the damper device 1 according to the seventh embodiment will be basically described mainly, and the other portions thereof will not be described in detail.

The first sliding portion 600 of the damper device 1 according to the ninth embodiment includes a second elastic member 604 that biases the first sliding surface 602a in the direction of moving closer to the first plate 100A (in the rightward direction on the drawing sheet of FIG. 17). The first sliding portion 600 according to the ninth embodiment may be engaged with the control plate 300 to be rotatable together with the control plate 300. Consequently, first sliding torque can be generated reliably and efficiently when the control plate 300 and the disk plate 100 are rotated relative to each other.

The first plate 100A is biased in the direction of moving away from the control plate 300 (in the rightward direction on the drawing sheet of FIG. 17) by the biasing force of the second elastic member 604 discussed above. The biasing force is transferred also to the second plate 100B integrated with the first plate 100A via the rivets 120, and therefore the second plate 100B is biased in the direction of moving closer to the hub 200 (in the rightward direction on the drawing sheet of FIG. 17). Consequently, the third sliding torque discussed above can be generated reliably and efficiently on the first surface 502x and the second surface 502y of the thrust member 500.

In the ninth embodiment, as in the sixth embodiment, the second sliding torque is set to be larger than the first sliding torque. In the ninth embodiment, the resultant torque of the third sliding torque and the first sliding torque is used as "small hysteresis torque", and the resultant torque of the third sliding torque and the second sliding torque is used as "large hysteresis torque".

3-9. Tenth Embodiment

Figure 18:
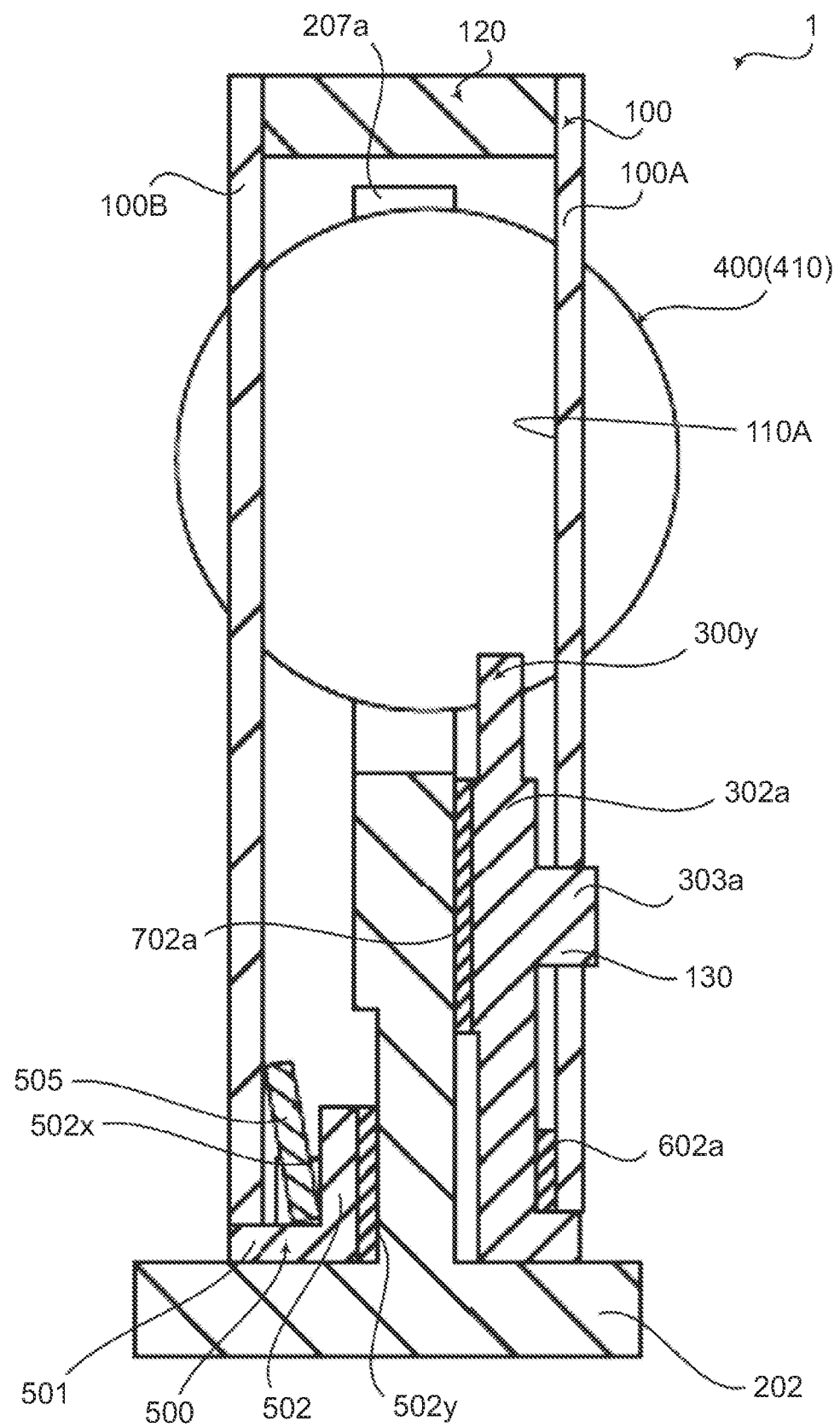
FIG. 18 is a schematic sectional view schematically illustrating the configuration of a damper device according to a tenth embodiment.

Next, the configuration of a damper device 1 according to a tenth embodiment will be described with reference to FIG. 18. FIG. 18 is a schematic sectional view schematically illustrating the configuration of the damper device 1 according to the tenth embodiment. FIG. 18 indicates in a simple manner that the damper device 1 according to the tenth embodiment has the following configuration that is different from that of the damper device 1 according to the first embodiment, focusing on the region I. Thus, while some constituent elements that are common to the damper device 1 according to the first embodiment illustrated in FIG. 3 etc. and the damper device 1 according to the tenth embodiment illustrated in FIG. 18 are expressed slightly differently in FIG. 18 for convenience, it should be understood that the shape etc. of the constituent elements according to the two embodiments are basically common, except for the following different configuration.

While the damper device 1 according to the tenth embodiment is configured in substantially the same manner as that according to the seventh embodiment discussed above, the first sliding portion 600 and the second sliding portion 700 are formed integrally with the control plate 300, as in the fifth embodiment. That is, the control plate 300, the first sliding portion 600, and the second sliding portion 700 are formed as one integral structure. The thus formed integral structure can be grasped as a control plate 300y (the control plate according to the tenth embodiment is referred to as a "control plate 300y" for convenience) that provides both the function of the first sliding portion 600 and the function of the second sliding portion 700 according to the seventh embodiment.

Thus, the control plate 300y according to the tenth embodiment can include, on the radially extending portion 302, the first sliding surface 602a that is directly slid with respect to the inner surface 110A of the first plate 100A to generate first sliding torque and the second sliding surface 702a that is directly slid with respect to the hub 200 (disk portion 205) to generate second sliding torque. Consequently, the damper device 1 according to the tenth embodiment can operate in the same manner as the damper device 1 according to the seventh embodiment.

In the tenth embodiment, as in the seventh embodiment, the second sliding torque is set to be larger than the first sliding torque. In the tenth embodiment, the resultant torque of the third sliding torque and the first sliding torque is used as "small hysteresis torque", and the resultant torque of the third sliding torque and the second sliding torque is used as "large hysteresis torque".

3-10. Others

While an example in which the control plate 300 is housed in the first housing space 100x has been discussed in detail in relation to all the embodiments described above, the control plate 300 may be housed in the second housing space 100y as discussed above. In this case, constituent elements disposed in the first housing space 100x and constituent elements disposed in the second housing space 100y should be interchanged with each other in all the embodiments.

While various embodiments have been discussed above, the above embodiments are merely exemplary, and are not intended to limit the scope of the invention as described in the claims. The above embodiments can be implemented in various other forms, and can be subjected to a variety of omissions, replacements, and changes without departing from the gist of the disclosure. The configuration, shape, size, length, width, thickness, height, number, etc. can be changed as appropriate. The various embodiments discussed above can also be applied to damper devices for purposes that do not require the limiter function discussed above such as a clutch disk, for example.

What is claimed is:

1. A damper device comprising:
   a first rotary body that includes at least a first plate that is rotatable about a rotational axis and a second plate that is disposed to face the first plate and that is rotatable about the rotational axis together with the first plate;
   a second rotary body that is rotatable relative to the first rotary body about the rotational axis;
   an elastic mechanism portion that elastically couples the first rotary body and the second rotary body to each other in a rotational direction;
   a control plate that includes a radially extending portion that extends in a radial direction to abut against the elastic mechanism portion and an axially extending portion that extends in an axial direction to be at least partially housed in one of the first rotary body and the second rotary body, the control plate being disposed in only one of a first housing space between the first plate and the second rotary body and a second housing space between the second plate and the second rotary body in the axial direction;
a first sliding portion that is disposed between the first rotary body and the control plate and that is slid with respect to at least one of the first rotary body and the control plate to generate first sliding torque; and
a second sliding portion that is disposed between the second rotary body and the control plate and that is slid with respect to at least one of the second rotary body and the control plate to generate second sliding torque, wherein
the first sliding torque and the second sliding torque are generated when the first rotary body and the second rotary body are rotated relative to each other, and
one of the first sliding torque and the second sliding torque is larger than the other, and is generated only when the first rotary body and the second rotary body are rotated relative to each other in only one direction.

2. The damper device according to claim 1, wherein:
the elastic mechanism portion includes a first elastic member and a pair of seat members that supports the first elastic member by holding the first elastic member between the seat members from both sides; and
the radially extending portion abuts against the first elastic member or one of the pair of seat members.

3. The damper device according to any one of claim 1, wherein the first sliding portion includes a first sliding surface that is slid with respect to the first rotary body or the radially extending portion and a second elastic member that biases the first sliding surface in a direction of moving closer to the first rotary body or the radially extending portion.

4. The damper device according to claim 1, wherein the second sliding portion includes a second sliding surface that is slid with respect to the second rotary body or the radially extending portion and a third elastic member that biases the second sliding surface in a direction of moving closer to the second rotary body or the radially extending portion.

5. The damper device according claim 1, wherein:
the first sliding portion and the second sliding portion are formed integrally with the control plate to function as a part of the control plate; and
the radially extending portion is directly slid with respect to the first rotary body, and directly slid with respect to the second rotary body.

6. The damper device according to claim 1, wherein a thrust member that includes at least one of a first surface that is slid with respect to the first rotary body and a second surface that is slid with respect to the second rotary body is further provided in one of the first housing space and the second housing space that is different from one of the first housing space and the second housing space in which the control plate is disposed.

7. The damper device according to claim 6, wherein the thrust member includes a fourth elastic member that biases the second surface in a direction of moving closer to the second rotary body.

* * * * *